United States Patent
Tsuiki et al.

(10) Patent No.: US 10,236,738 B2
(45) Date of Patent: Mar. 19, 2019

(54) ROTARY ELECTRIC MACHINE

(71) Applicants: Hironori Tsuiki, Tokyo (JP); Hiroyuki Akita, Tokyo (JP); Atsushi Sakaue, Tokyo (JP); Masaya Inoue, Tokyo (JP); Akira Hashimoto, Tokyo (JP)

(72) Inventors: Hironori Tsuiki, Tokyo (JP); Hiroyuki Akita, Tokyo (JP); Atsushi Sakaue, Tokyo (JP); Masaya Inoue, Tokyo (JP); Akira Hashimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 578 days.

(21) Appl. No.: 14/766,719

(22) PCT Filed: Feb. 18, 2013

(86) PCT No.: PCT/JP2013/053870
§ 371 (c)(1),
(2) Date: Aug. 7, 2015

(87) PCT Pub. No.: WO2014/125646
PCT Pub. Date: Aug. 21, 2014

(65) Prior Publication Data
US 2015/0381001 A1  Dec. 31, 2015

(51) Int. Cl.
*H02K 3/04* (2006.01)
*H02K 3/28* (2006.01)
*H02K 3/12* (2006.01)

(52) U.S. Cl.
CPC .............. *H02K 3/28* (2013.01); *H02K 3/12* (2013.01)

(58) Field of Classification Search
CPC .................................. H02K 3/28; H02K 3/12
(Continued)

(56) References Cited

U.S. PATENT DOCUMENTS 6,590,310 B2 * 7/2003 Takano .................. H02K 3/522
29/596
6,897,594 B2 * 5/2005 Ichikawa ................. H02K 3/12
310/180

(Continued)

FOREIGN PATENT DOCUMENTS

JP    2001-292544 A    10/2001
JP    2008-104293 A     5/2008
(Continued)

OTHER PUBLICATIONS

International Search Report (PCT/ISA/210) dated May 14, 2013, by the Japanese Patent Office as the International Searching Authority for International Application No. PCT/JP2013/053870.
(Continued)

*Primary Examiner* — Jianchun Qin
(74) *Attorney, Agent, or Firm* — Buchanan Ingersoll & Rooney PC

(57) ABSTRACT

The armature winding is configured by mounting into slot pairs n types of winding bodies that are each configured by winding a conductor wire for m turns into a helical shape, where m is a natural number that is greater than or equal to two, the n types of winding bodies have different spacings between rectilinear portions that are linked by coil ends, are housed in n adjacent pairs of slot pairs, and are configured so as to be concentric, the coil ends include a top portion at an approximately central portion, and the radial displacement at the top portion is approximately a×d, where a is a natural number that is greater than or equal to 1 and less than or equal to (m−1), and d is a radial thickness of the rectilinear portions that are housed inside the slots.

6 Claims, 20 Drawing Sheets

(58) Field of Classification Search
USPC .......................................................... 310/208
See application file for complete search history.

(56) References Cited

U.S. PATENT DOCUMENTS

| | | |
|---|---|---|
| 2001/0035691 A1 | 11/2001 | Yokota |
| 2008/0093948 A1 | 4/2008 | Naganawa |
| 2010/0148621 A1* | 6/2010 | Ishizuka .................. H02K 3/12 310/201 |
| 2012/0025658 A1* | 2/2012 | Watanabe ................ H02K 3/12 310/179 |
| 2014/0021823 A1 | 1/2014 | Kitamura et al. |

FOREIGN PATENT DOCUMENTS

| | | |
|---|---|---|
| JP | 2009-189078 A | 8/2009 |
| WO | WO 2012/137306 A1 | 10/2012 |

OTHER PUBLICATIONS

Written Opinion (PCT/ISA/237) dated May 14, 2013, by the Japanese Patent Office as the International Searching Authority for International Application No. PCT/JP2013/053870.

* cited by examiner

← COOLANT FLOW CHANNELS

← COOLANT FLOW CHANNELS

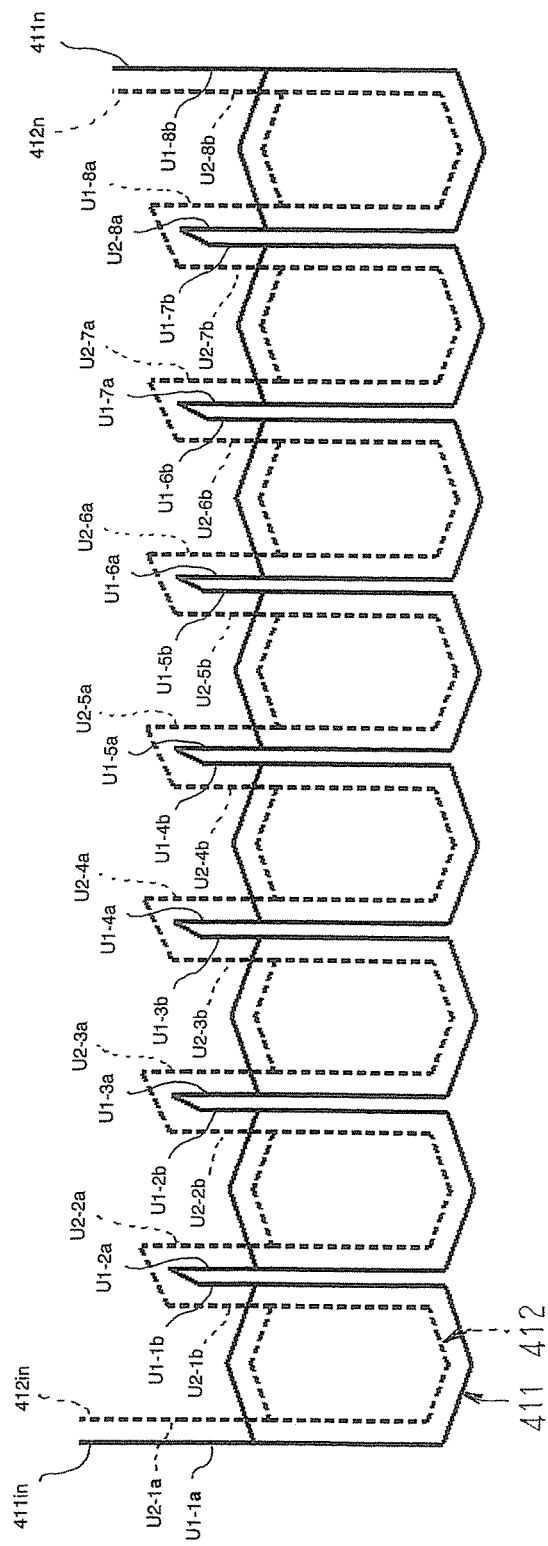

ROTARY ELECTRIC MACHINE

TECHNICAL FIELD

The present invention relates to a rotary electric machine, such as an electric motor or a generator.

BACKGROUND ART

In recent years, compactness and high output have been required in rotary electric machines such as electric motors or generators. With regard to downsizing rotary electric machines of this kind, stator windings that have concentrated windings in which conductor wires are wound onto individual stator core teeth have been used with a view to downsizing coil ends that do not generate effective magnetic flux. However, stators that use stator windings of distributed winding construction that can suppress torque pulsation and increase output are also in demand.

Now, in contrast to concentrated windings, which are configured by winding conductor wires onto individual teeth, windings that are configured by winding conductor wires into slots that are separated by greater than or equal to two slots are called "distributed windings". In other words, distributed windings are wound such that a conductor wire that extends outward from one slot spans two or more consecutive teeth and enters another slot.

In consideration of such conditions, in conventional rotary electric machines such as that described in Patent Literature 1, winding coils that are formed into a coil shape by winding a rectangular conductor wire a plurality of times, also known as "hexagonal coils", are housed in respective pairs of slots that are separated by a predetermined number of slots to constitute a distributed-winding stator winding (see Patent Literature 1, for example).

CITATION LIST

Patent Literature

[Patent Literature 1]: Japanese Patent Laid-Open No. 2008-104293 (Gazette)

SUMMARY OF THE INVENTION

Problem to be Solved by the Invention

In conventional rotary electric machines, because insertion of the hexagonal coils into bottom portions of a first slot and opening portions of a second slot in pairs of slots that are separated by a predetermined number of slots is implemented by shaping bundles of coil ends of the hexagonal coils by bending at vertex portions into crank shapes that are offset by complete width dimensions in a direction of alignment of conductor wires that constitute the hexagonal coils, some problems have been that the coil ends are larger, making downsizing unachievable, and that the length of the conductor wires is increased, increasing winding resistance and reducing efficiency.

In conventional rotary electric machines, because the bundles of coil ends of the hexagonal coils are shaped by bending at the vertex portions into crank shapes, the vertex portions of the coil ends that are adjacent to each other in a radial direction of the respective hexagonal coils contact each other or are extremely close to each other. Thus, columns of vertex portions of coil ends that are lined up without gaps in a radial direction are arranged circumferentially, and coolant flow channels that have flow channel directions in a radial direction are formed between the columns of vertex portions. However, because the columns of vertex portions are arranged at a pitch of one slot circumferentially, another problem has been that flow channel width is narrow, reducing heat radiating area and preventing sufficient winding cooling performance from being achieved.

The present invention aims to solve the above problems and an object of the present invention is to provide a rotary electric machine that enables compactness and increased efficiency to be achieved by enabling increases in heat radiating area in coil end groups, to improve cooling performance of an armature winding while suppressing increases in dimensions of the coil end groups.

Means for Solving the Problem

In order to achieve the above object, according to one aspect of the present invention, there is provided a rotary electric machine including an armature that includes: an annular armature core in which slots are formed at a ratio of n per phase per pole, where n is a natural number that is greater than or equal to two; and an armature winding that is mounted to the armature core. The armature winding is configured by mounting into respective corresponding slot pairs n types of winding bodies that are each configured by winding a jointless, continuous conductor wire that is coated with insulation for m turns into a helical shape in which end portions of rectilinear portions are linked together by coil ends, where m is a natural number that is greater than or equal to two, the n types of winding bodies having different spacings between the rectilinear portions that are linked by the coil ends, and the n types of winding bodies are housed in n adjacent pairs of slot pairs and are configured so as to be concentric. The coil ends include a top portion that displaces by a predetermined amount in a radial direction at an approximately central portion between the linked rectilinear portions, and the radial displacement at the top portion is approximately $a \times d$, where a is a natural number that is greater than or equal to 1 and less than or equal to $(m-1)$, and d is a radial thickness of the rectilinear portions that are housed inside the slots, $2 \times m$ of the rectilinear portions of two different types of the winding bodies being housed inside the slots so as to line up in single columns in a radial direction.

Effects of the Invention

According to the present invention, because the amount of radial displacement at the top portions of the coil ends is smaller than a total thickness ($m \times d$) of the m rectilinear portions that constitute each of the columns of winding bodies, increases in coil end group dimensions are suppressed, the rotary electric machine can be reduced in size.

Because the n types of winding bodies are housed in n adjacent pairs of slot pairs and are configured so as to be concentric, columns of top portions that are lined up in a radial direction of the winding bodies that are positioned on an outer side of the n types of winding bodies that are disposed concentrically are arranged circumferentially at a predetermined pitch on axial ends of the coil end groups. Consequently, coolant flow channels that have large flow channel widths and that have flow channel directions in a radial direction are formed between the columns of top portions that are lined up radially. In addition, because gaps are formed between the top portions that are lined up radially, coolant flow channels that have flow channel directions in a circumferential direction are formed between the top portions that are lined up radially. Thus, the heat radiating area of the coil end groups is increased, enabling the cooling performance of the armature winding to be improved, and also enabling increased efficiency to be achieved in the rotary electric machine.

BRIEF DESCRIPTION OF THE DRAWINGS

FIG. 32 is a schematic diagram that explains a method for connecting a U-phase winding of a stator winding in the rotary electric machine according to Embodiment 3 of the present invention;

DESCRIPTION OF EMBODIMENTS

Preferred embodiments of a rotary electric machine according to the present invention will now be explained with reference to the drawings.

Embodiment 1

Figure 1:
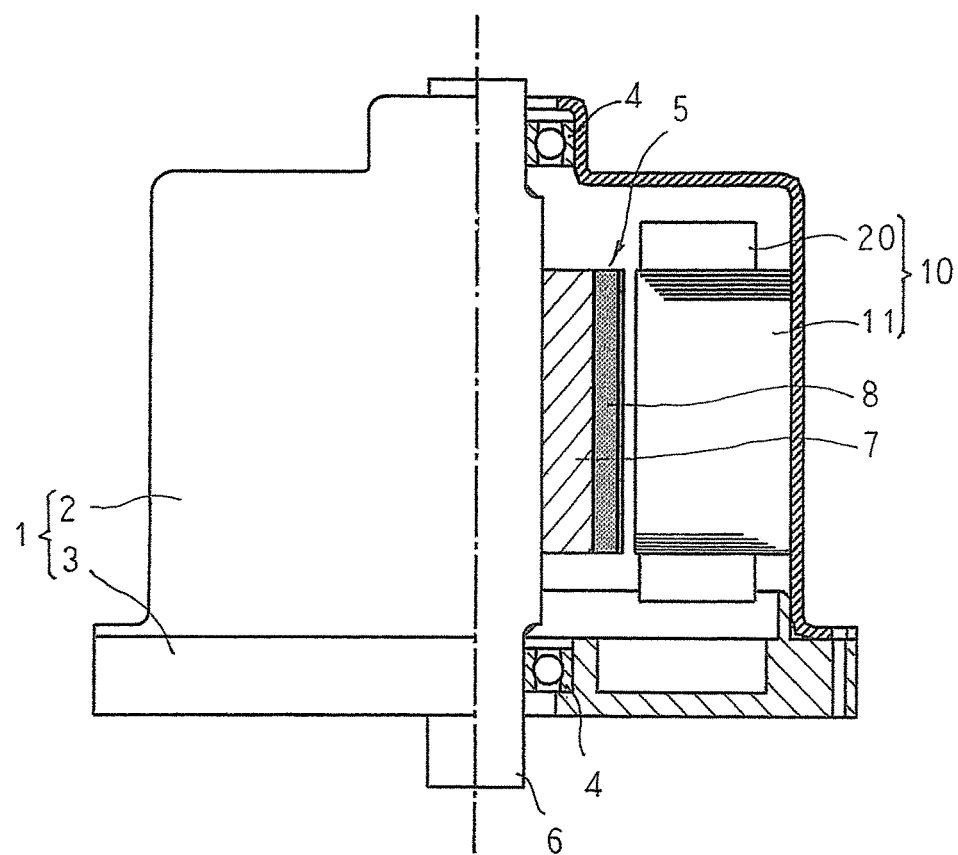
FIG. 1 is a half section that shows a rotary electric machine according to Embodiment 1 of the present invention.
Figure 2:
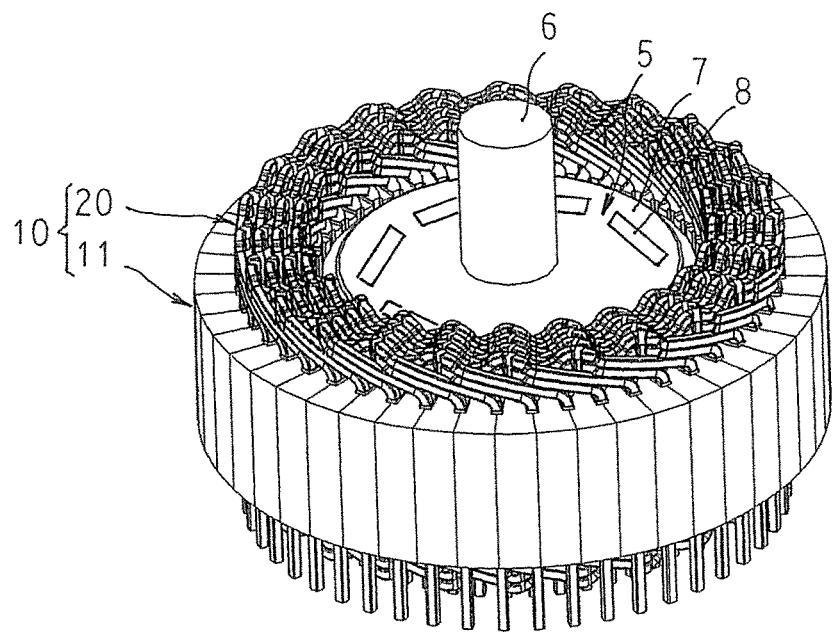
FIG. 2 is an oblique projection that shows part of the rotary electric machine according to Embodiment 1 of the present invention.
Figure 3:
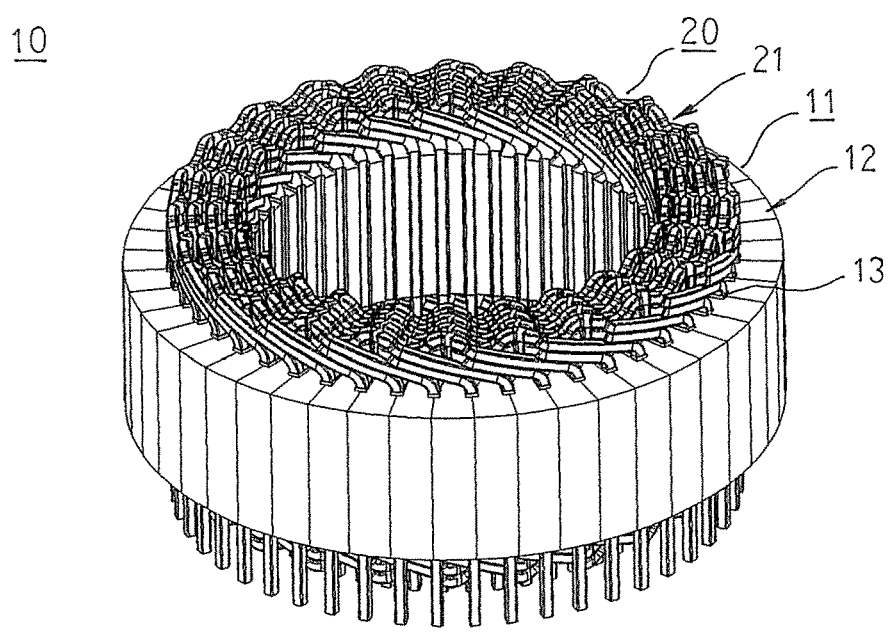
FIG. 3 is an oblique projection that shows a stator that is used in the rotary electric machine according to Embodiment 1 of the present invention.
Figure 4:
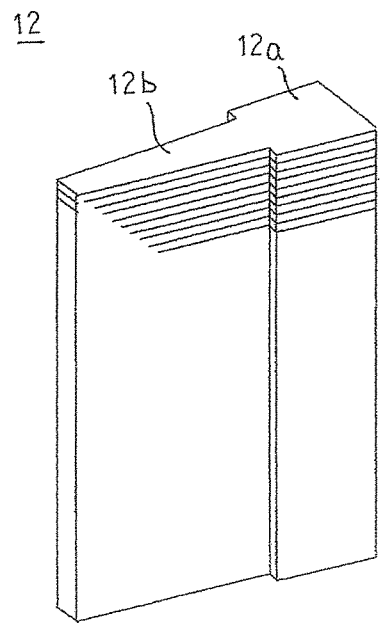
FIG. 4 is an oblique projection that shows a core block that constitutes a stator core that is used in the rotary electric machine according to Embodiment 1 of the present invention.
Figure 5:
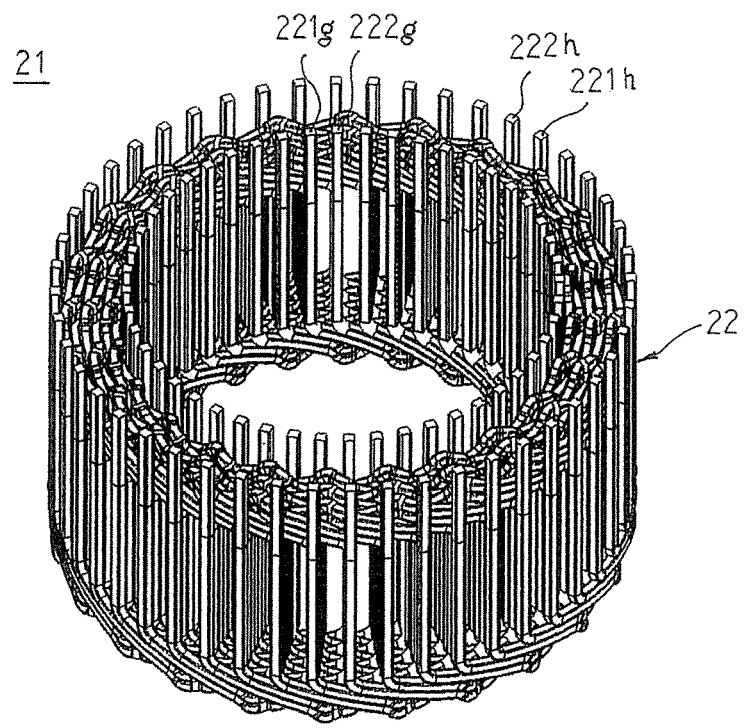
FIG. 5 is an oblique projection that shows a winding assembly that constitutes a stator winding that is used in the rotary electric machine according to Embodiment 1 of the present invention.
Figure 6:
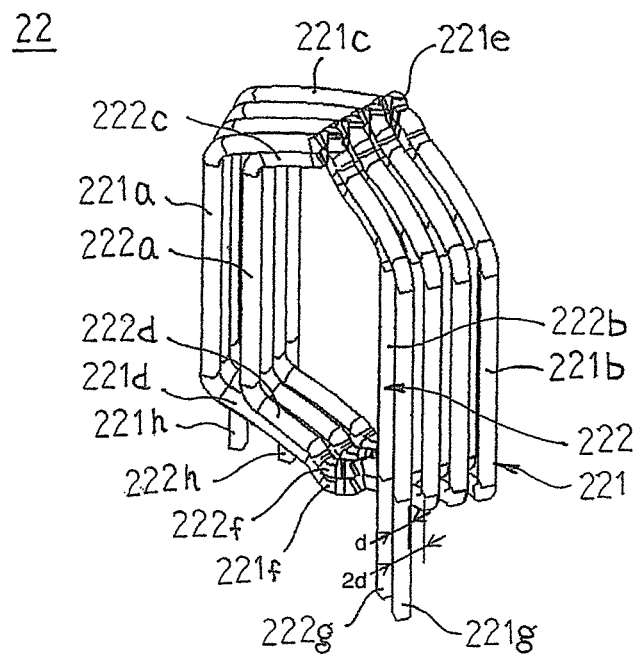
FIG. 6 is an oblique projection that shows a winding body that constitutes a winding assemblage in the rotary electric machine according to Embodiment 1 of the present invention.
Figure 7:
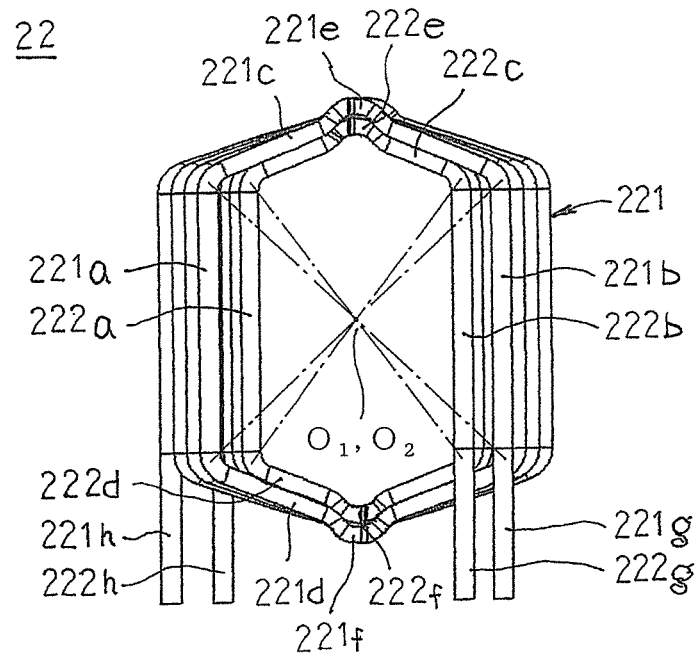
FIG. 7 is a front elevation that shows the winding body that constitutes the winding assemblage in the rotary electric machine according to Embodiment 1 of the present invention.
Figure 8:
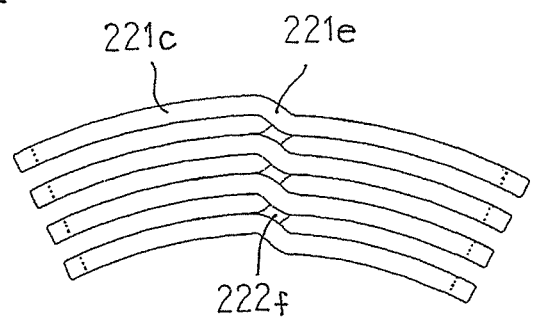
FIG. 8 is a plan that shows the winding body that constitutes the winding assemblage in the rotary electric machine according to Embodiment 1 of the present invention.
Figure 9:
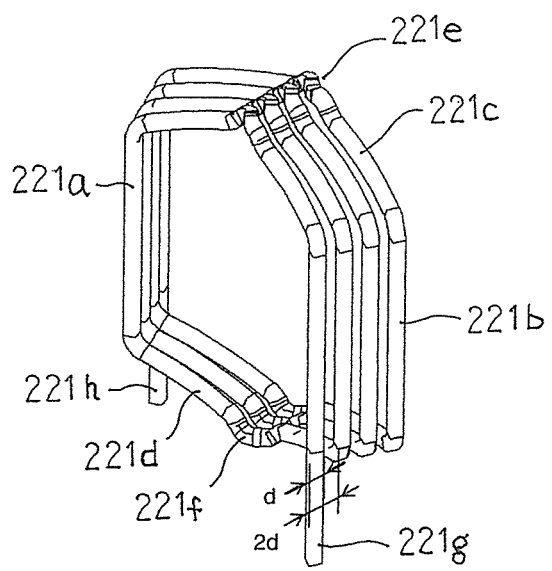
FIG. 9 is an oblique projection that shows a first winding body that constitutes the winding assemblage in the rotary electric machine according to Embodiment 1 of the present invention.
Figure 10:
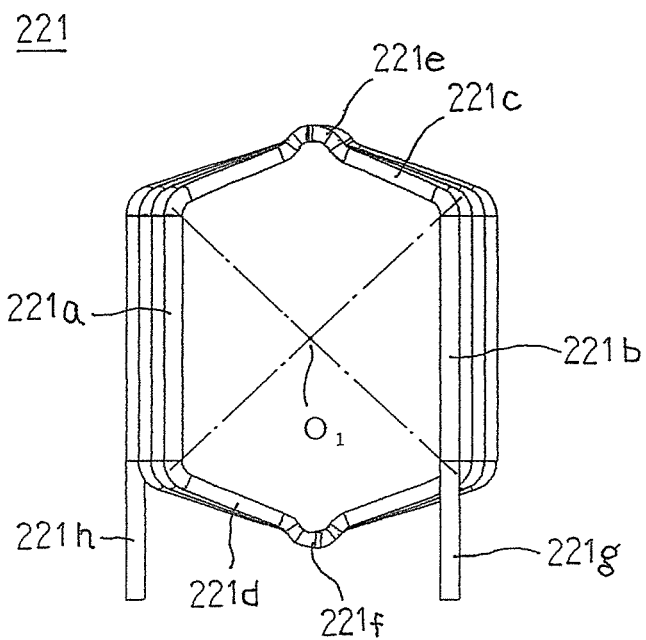
FIG. 10 is a front elevation that shows the first winding body that constitutes the winding assemblage in the rotary electric machine according to Embodiment 1 of the present invention.
Figure 11:
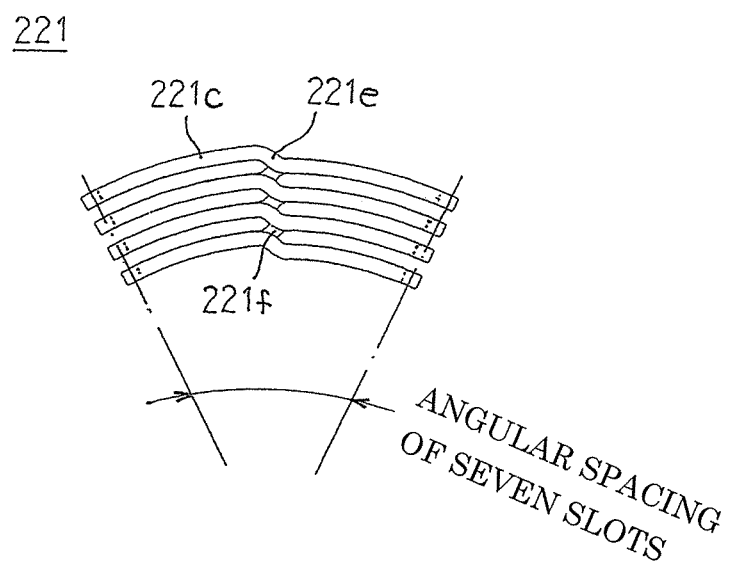
FIG. 11 is a plan that shows the first winding body that constitutes the winding assemblage in the rotary electric machine according to Embodiment 1 of the present invention.
Figure 12:
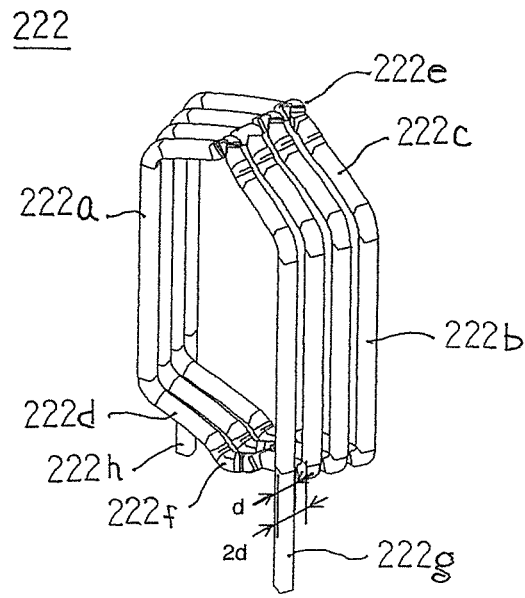
FIG. 12 is an oblique projection that shows a second winding body that constitutes the winding assemblage in the rotary electric machine according to Embodiment 1 of the present invention.
Figure 13:
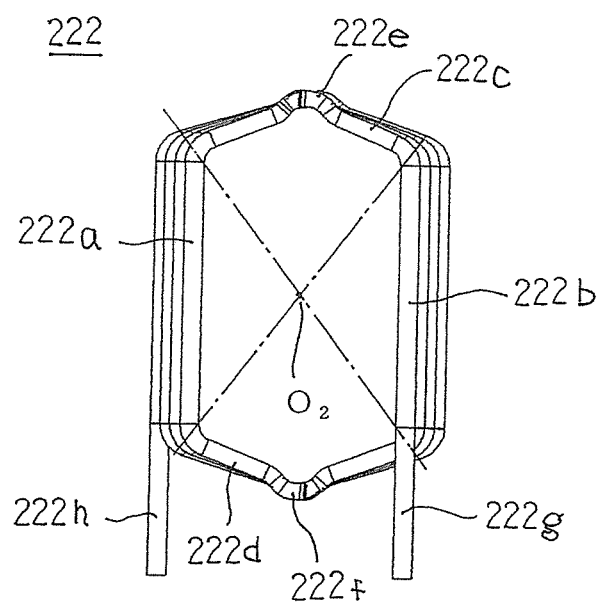
FIG. 13 is a front elevation that shows the second winding body that constitutes the winding assemblage in the rotary electric machine according to Embodiment 1 of the present invention.
Figure 14:
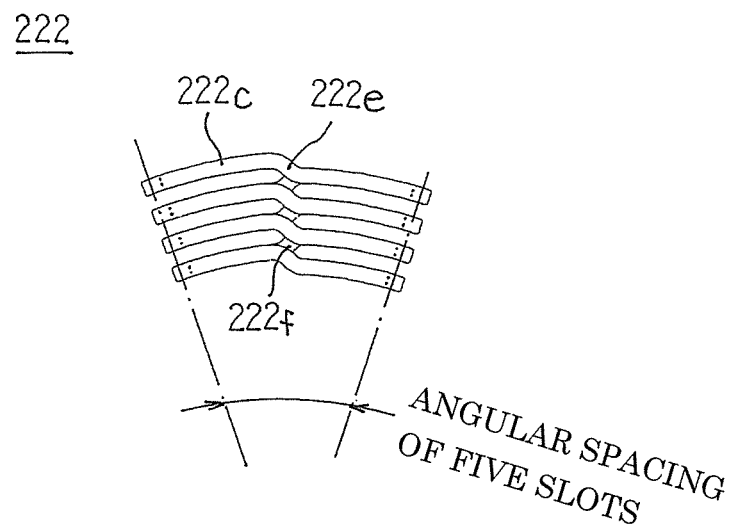
FIG. 14 is a plan that shows the second winding body that constitutes the winding assemblage in the rotary electric machine according to Embodiment 1 of the present invention.
Figure 15:
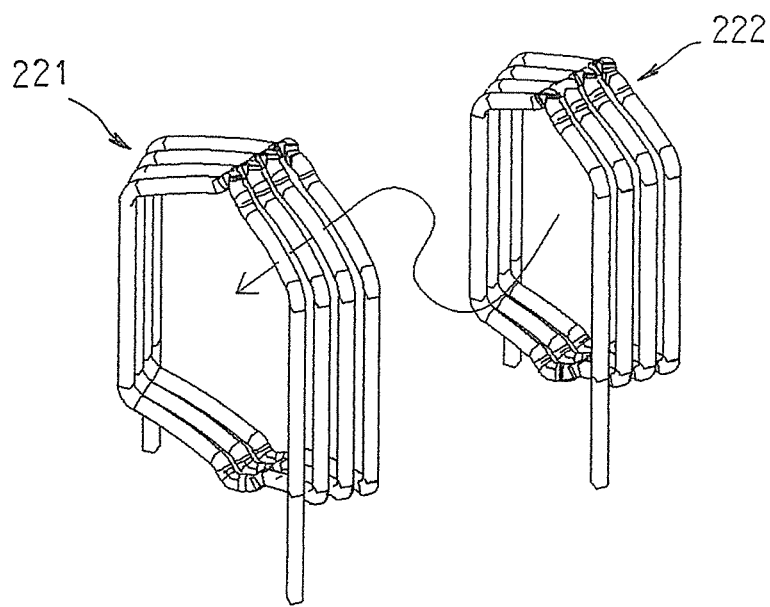
FIG. 15 is a diagram that explains a method for assembling the winding assemblage according to Embodiment 1 of the present invention.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows a stator that is used in the rotary electric machine according to Embodiment 1 of the present invention, FIG. 4 is an oblique projection that shows a core block that constitutes a stator core that is used in the rotary electric machine according to Embodiment 1 of the present invention, FIG. 5 is an oblique projection that shows a winding assembly that constitutes a stator winding that is used in the rotary electric machine according to Embodiment 1 of the present invention, FIG. 6 is an oblique projection that shows a winding body that constitutes a winding assemblage in the rotary electric machine according to Embodiment 1 of the present invention, FIG. 7 is a front elevation that shows the winding body that constitutes the winding assemblage in the rotary electric machine according to Embodiment 1 of the present invention, FIG. 8 is a plan that shows the winding body that constitutes the winding assemblage in the rotary electric machine according to Embodiment 1 of the present invention, FIG. 9 is an oblique projection that shows a first winding body that constitutes the winding assemblage in the rotary electric machine according to Embodiment 1 of the present invention, FIG. 10 is a front elevation that shows the first winding body that constitutes the winding assemblage in the rotary electric machine according to Embodiment 1 of the present invention, FIG. 11 is a plan that shows the first winding body that constitutes the winding assemblage in the rotary electric machine according to Embodiment 1 of the present invention, FIG. 12 is an oblique projection that shows a second winding body that constitutes the winding assemblage in the rotary electric machine according to Embodiment 1 of the present invention, FIG. 13 is a front elevation that shows the second winding body that constitutes the winding assemblage in the rotary electric machine according to Embodiment 1 of the present invention, FIG. 14 is a plan that shows the second winding body that constitutes the winding assemblage in the rotary electric machine according to Embodiment 1 of the present invention, and FIG. 15 is a diagram that explains a method for assembling the winding assemblage according to Embodiment 1 of the present invention.

In FIGS. 1 and 2, a rotary electric machine 100 includes: a housing 1 that has: a floored cylindrical frame 2; and an end plate 3 that closes an opening of the frame 2; a stator 10 that functions as an armature that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the stator 10.

The rotor 5 is a permanent-magnet rotor that includes: a rotor core 7 that is fixed to the rotating shaft 6, which is inserted through a central position thereof; and eight permanent magnets 8 that are embedded so as to pass through axially near an outer circumferential surface of the rotor core 7 so as to be arranged at a predetermined pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the stator 10 will be explained in detail with reference to FIGS. 3 through 8.

As shown in FIG. 3, the stator 10 includes: a stator core 11 that functions as an armature core; and a stator winding 20 that functions as an armature winding 20 that is mounted to the stator core 11. Here, to facilitate explanation, the number of poles in the rotor 5 is eight, the number of slots in the stator core 11 is forty-eight, and the stator winding 20 is a three-phase alternating-current winding. In other words, the slots are formed on the stator core 11 at a ratio of two slots per phase per pole.

As shown in FIG. 4, core blocks 12 are made by dividing the annular stator core 11 into forty-eight equal sections circumferentially, and include: a core back portion 12a that has a circular arc-shaped cross section, that is produced by laminating and integrating a predetermined number of electromagnetic steel sheets; and a tooth 12b that is disposed so as to extend radially inward from an inner circumferential wall surface of the core back portion 12a. The stator core 11 is configured into an annular shape by arranging and integrating forty-eight core blocks 12 circumferentially by butting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 is oblong.

As shown in FIG. 3, the stator winding 20 is configured by applying a predetermined connection process to the winding assembly 21 that is mounted to the stator core 11. As shown in FIG. 5, the winding assembly 21 is configured by arranging winding assemblages 22 (described below) circumferentially. Winding ends 221g and 222g (described below) each project axially outward from the winding assembly 21, and are arranged on a radially inner side of the winding assembly 21 at a pitch of one slot circumferentially. Winding ends 221h and 222h (described below) each project axially outward from the winding assembly 21, and are arranged on a radially outer side of the winding assembly 21 at a pitch of one slot circumferentially. A predetermined joining process is applied to the winding ends 221g, 222g, 221h, and 222h of the winding assembly 21.

The winding assemblages 22 include a first winding body 221 and a second winding body 222 that are each configured by winding conductor wire that has an oblong cross section, that is made of jointless, continuous copper wire or aluminum wire that is coated with an insulating enamel resin, for four turns helically into an approximate hexagon shape so as to leave a constant spacing between each turn.

Here, the first winding bodies 221 and the second winding bodies 222 are produced by winding the conductor wire for four turns helically to produce a tubular coil body, and subsequently forming the coil body into an approximate hexagon shape using a coil forming machine, for example. Moreover, the first winding bodies 221 and the second winding bodies 222 may be produced by a folding and bending process so as to bend a conductor wire into an approximate hexagon shape while winding it helically.

As shown in FIGS. 9 through 11, the first winding bodies 221 include: first and second rectilinear portions 221a and 221b that form two columns that are separated by an angular spacing of seven slots in which four of each are arranged in a direction of short sides of the oblong cross sections so as to leave gaps d in each of the columns; and first and second coil ends 221c and 221d that alternately link first longitudinal ends to each other and second longitudinal ends to each other between the columns of first and second rectilinear portions 221a and 221b. Moreover, d is a length of the short sides of the oblong cross sections of the conductor wires. An angular spacing of seven slots is a pitch between slot centers of slots 13 on two sides of seven consecutive teeth 12b, and corresponds to a pitch of seven slots.

The first coil ends 221c extend outward at a predetermined inclination longitudinally outward relative to the first and second rectilinear portions 221a and 221b from first ends of first rectilinear portions 221a in a first column toward second rectilinear portions 221b in a second column, are displaced by a distance d in a direction of arrangement of the first and second rectilinear portions 221a and 221b by being bent at central portions (first top portions 221e) between the columns of first and second rectilinear portions 221a and 221b, and are subsequently bent back and extend longitudinally inward relative to the first and second rectilinear portions 221a and 221b toward the second rectilinear portions 221b in the second column at a predetermined inclination, and are connected to first ends of the second rectilinear portions 221b in the second column.

Similarly, the second coil ends 221d extend outward at a predetermined inclination longitudinally outward relative to the first and second rectilinear portions 221a and 221b from second ends of the second rectilinear portions 221b in the second column toward first rectilinear portions 221a in the first column, are displaced by a distance d in a direction of arrangement of the first and second rectilinear portions 221a and 221b by being bent at central portions (second top portions 221f) between the columns of first and second rectilinear portions 221a and 221b, and are subsequently bent approximately back and extend longitudinally inward relative to the first and second rectilinear portions 221a and 221b toward the first rectilinear portions 221a in the first column at a predetermined inclination, and are connected to second ends of the first rectilinear portions 221a in the first column.

In first winding bodies 221 that are configured in this manner, the first and second rectilinear portions 221a and 221b are each arranged in the direction of the short sides of the oblong cross sections at a pitch of approximately (2×d) that is approximately twice the length of the short sides such that flat surfaces that are constituted by the long sides of the oblong cross sections face each other. The first rectilinear portions 221a and the second rectilinear portions 221b that are connected by the first coil ends 221c and the second coil ends 221d are offset in the direction of arrangement by a distance d by the first top portions 221e and the second top portions 221f.

The first winding bodies 221 also include: a winding end 221h that extends outward in the longitudinal direction from the second end of a first rectilinear portion 221a that is positioned at a first end in the direction of arrangement in the first column; and a winding end 221g that extends outward in the longitudinal direction from the second end of a second rectilinear portion 221b that is positioned at a second end in the direction of arrangement in the second column. Moreover, as shown in FIG. 10, a point of intersection of diagonals of a rectangular shape that has the first rectilinear portions 221a and the second rectilinear portions 221b as two parallel sides when the first winding bodies 221 are viewed from radially inside will be designated a center O1 of the first winding bodies 221.

As shown in FIGS. 12 through 14, the second winding bodies 222 include first and second rectilinear portions 222a and 222b, first and second coil ends 222c and 222d, first and second top portions 222e and 222f, and winding ends 222h and 222g. Moreover, the second winding bodies 222 are configured in a similar manner to that of the first winding bodies 221 except that the columns of first rectilinear portions 222a and the columns of second rectilinear portions 222b are separated by an angular spacing of four slots. The first winding bodies 221 are configured so as to have a winding pitch of a long-pitch winding, and the second winding bodies 222 are configured so as to have a winding pitch of a short-pitch winding. Moreover, as shown in FIG. 13, a point of intersection of diagonals of a rectangular shape that has the first rectilinear portions 222a and the second rectilinear portions 222b as two parallel sides when the first winding bodies 222 are viewed from radially inside will be designated a center O2 of the first winding bodies 222.

Now, as shown in FIG. 15, the winding assemblages 22 are produced by installing the second winding bodies 222 from beside the first winding bodies 221. Specifically, the first rectilinear portions 222a in the first column of a second winding body 222 are inserted between the second rectilinear portions 221b in the second column of a first winding body 221 from beside the first winding body 221. Then, the second winding body 22 is moved laterally until a position is reached at which the columns of the second rectilinear portions 222b of the second winding body 222 are separated from the columns of second rectilinear portions 221b of the first winding body 221 by an angular spacing of one slot to assemble a winding assemblage 22.

In the winding assemblages 22 that are assembled in this manner, as shown in FIGS. 6 through 8, helical orbiting portions that are constituted by the first and second coil ends 222c and 222d and the first and second top portions 222e and 222f are inserted inside helical orbiting portions of the first winding bodies 221 that are constituted by the first and second rectilinear portions 221a and 221b, the first and second coil ends 221c and 221d, and the first and second top portions 221e and 221f. As shown in FIG. 7, the centers O2 of the second winding bodies align approximately with the centers O1 of the first winding bodies 221 when the winding assemblages 22 are viewed from radially inside, such that the first winding bodies 221 and the second winding bodies 222 are disposed concentrically. The respective orbiting portions of the second winding body 222 are positioned on an inner circumferential side of the corresponding orbiting portions of the first winding body 221.

Figure 17:
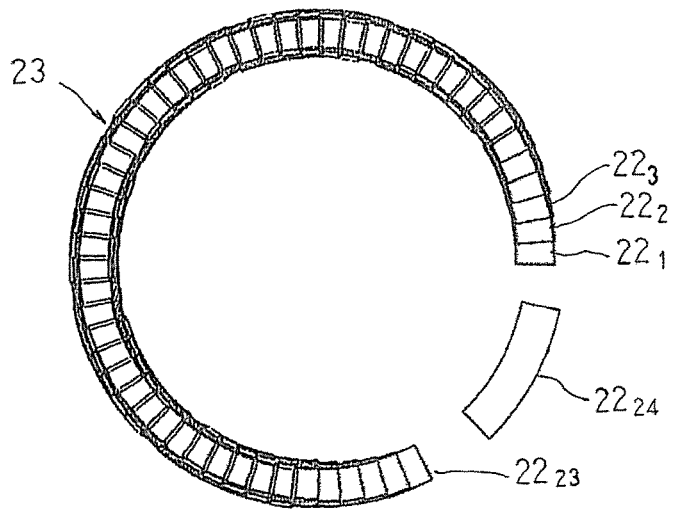
FIG. 17 is a diagram that explains the method for manufacturing the winding assembly according to Embodiment 1 of the present invention.
Figure 18:
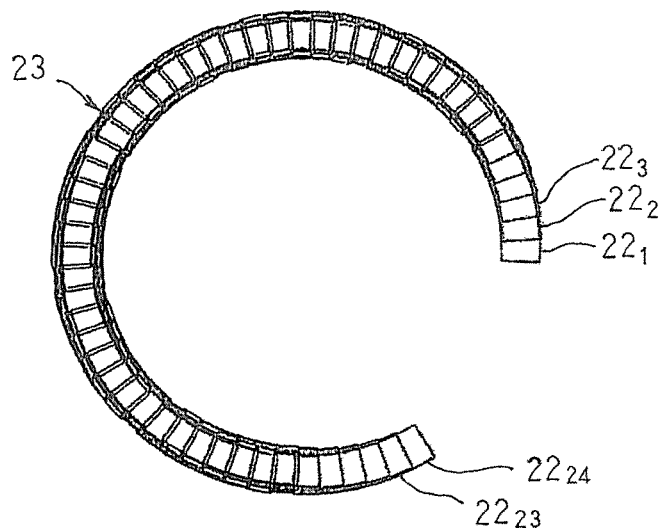
FIG. 18 is a diagram that explains the method for manufacturing the winding assembly according to Embodiment 1 of the present invention.
Figure 19:
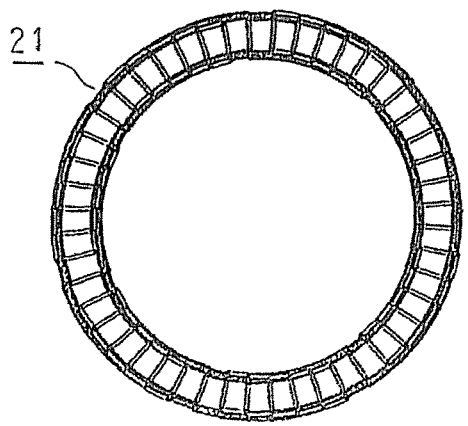
FIG. 19 is a diagram that explains the method for manufacturing the winding assembly according to Embodiment 1 of the present invention.
Figure 20:
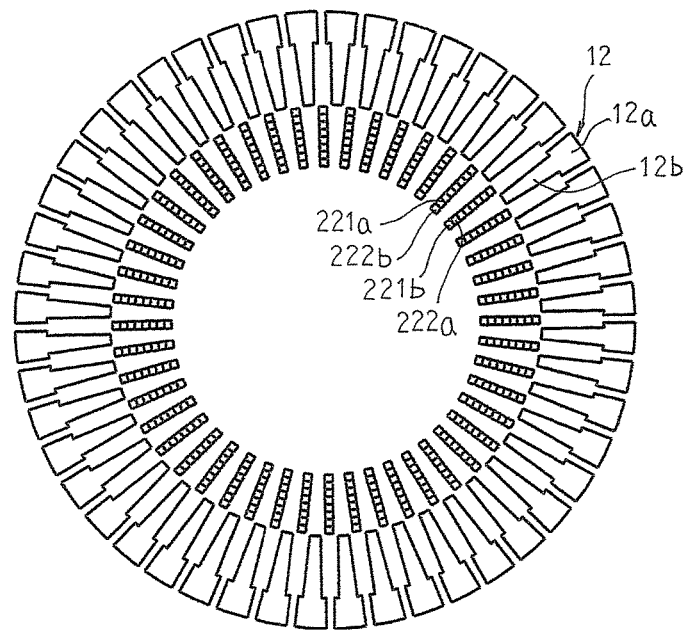
FIG. 20 is a diagram that explains a method for assembling the stator according to Embodiment 1 of the present invention.
Figure 21:
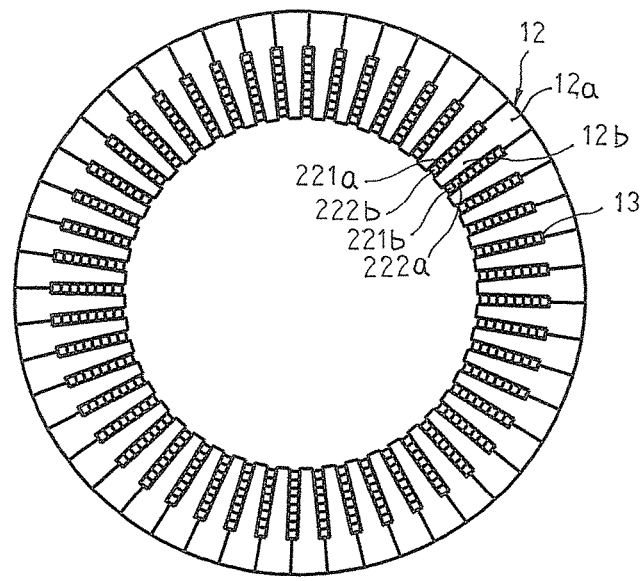
FIG. 21 is a diagram that explains the method for assembling the stator according to Embodiment 1 of the present invention.
Figure 22:
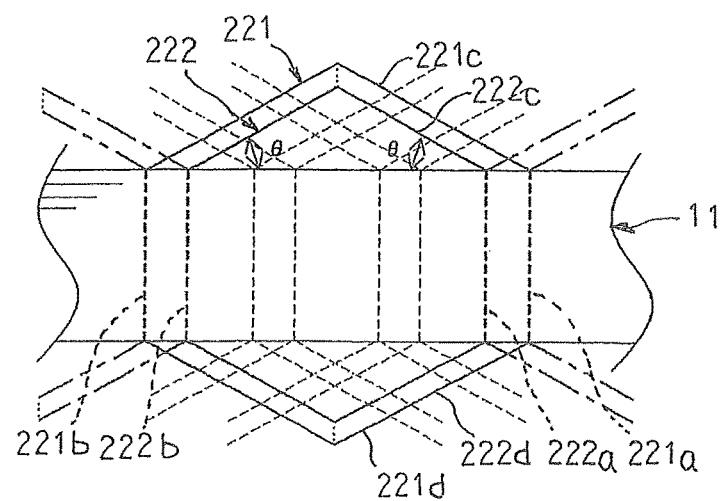
FIG. 22 is a developed projection in which a state in which the winding assemblage in the rotary electric machine according to Embodiment 1 of the present invention is mounted into the stator core is viewed from radially outside.
Figure 23A:
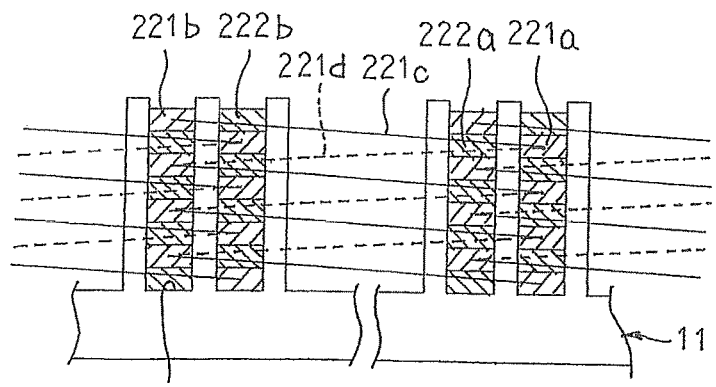
FIGS. 23A and 23B show developed projections in which the state in which winding assemblages in the rotary electric machine according to Embodiment 1 of the present invention are mounted into the stator core is viewed from a first axial end.
Figure 23B:
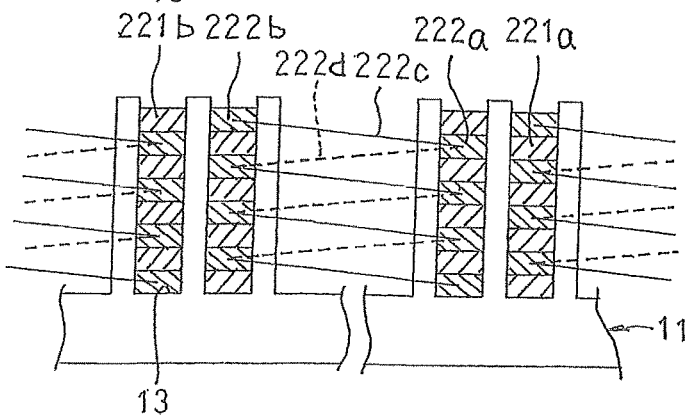

Next, a method for assembling the stator 10 will be explained. FIGS. 16A through 21 are diagrams that explain a method for manufacturing the winding assembly according to Embodiment 1 of the present invention, FIGS. 16A, 16B, 16C, and 16D showing a method for assembling two winding assemblages, and FIGS. 17 through 19 showing a procedure for installing a twenty-fourth winding assemblage. Here, to facilitate explanation, the winding assemblages 22 are designated winding assemblage $22_1$, winding assemblage $22_2$, winding assemblage $22_3$, etc., through winding assemblage 22₂₃, and winding assemblage 22₂₄, in order of mounting. FIGS. 20 and 21 are diagrams that explain a method for assembling the stator according to Embodiment 1 of the present invention, FIG. 20 showing a state before mounting core blocks into the winding assembly, and FIG. 21 showing a state after mounting the core blocks into the winding assembly. Moreover, for simplicity, only the first and second rectilinear portions 221a, 222a, 221b, and 222b of the winding assembly 21 are shown in FIGS. 20 and 21. FIG. 22 is a developed projection in which a state in which the winding assemblage in the rotary electric machine according to Embodiment 1 of the present invention is mounted into the stator core is viewed from radially outside, and FIGS. 23A and 23B show developed projections of a state in which three winding assemblages in the rotary electric machine according to Embodiment 1 of the present invention are mounted into identical slot groups of the stator core consecutively in a circumferential direction when viewed from a side near a first axial end, FIG. 23A showing arrangement of the first winding bodies, and FIG. 23B showing arrangement of the second winding bodies. Moreover, in FIG. 23, first coil ends are represented by solid lines, and second coil ends are represented by broken lines. Furthermore, for simplicity, first and second coil ends are represented using straight lines in FIG. 23.

Figure 16A:
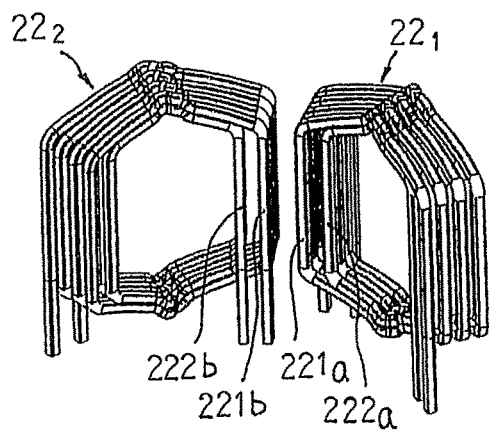
FIGS. 16A, 16B, 16C, and 16D show diagrams that explain a method for manufacturing the winding assembly according to Embodiment 1 of the present invention.
Figure 16B:
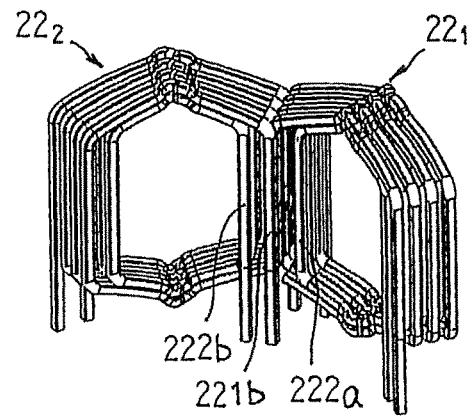
Figure 16C:
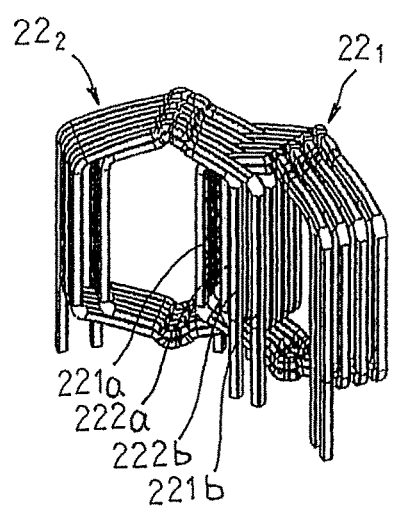
Figure 16D:
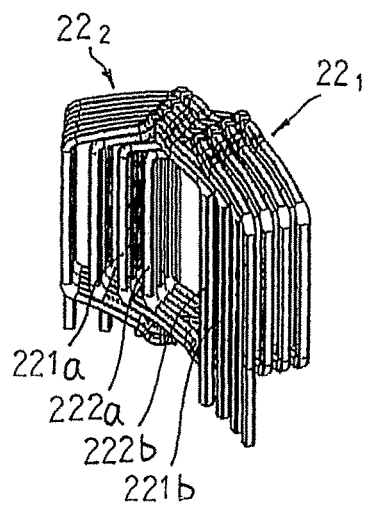

As shown in FIG. 16A, the first and second winding assemblages 22₁ and 22₂ are first placed circumferentially adjacent to each other so as to align axial height positions. Next, as shown in FIG. 16B, the second rectilinear portions 221b of the second winding assemblage 22₂ are inserted between the first rectilinear portions 221a of the first winding assemblage 22₁. Next, as shown in FIG. 16C, the second winding assemblage 22₂ is moved in a circumferential direction. Thus, the second rectilinear portions 221b and 222b of the second winding assemblage 222 pass between the first rectilinear portions 221a and 222a of the first winding assemblage 221, and move toward the second rectilinear portions 221b and 222b of the first winding assemblage 221. Then, as shown in FIG. 16D, the second winding assemblage 22₂ is moved circumferentially until the second rectilinear portions 221b of the second winding assemblage 22₂ are at a position that is separated by an angular spacing of one slot from the second rectilinear portions 221b of the first winding assemblage 22₁. The two winding assemblages 22₁ and 22₂ are assembled thereby.

The winding assemblages 22 are mounted sequentially in a similar manner by aligning axial height positions and moving them circumferentially until the twenty-third winding assemblage 22₂₃. As shown in FIG. 17, the assemblage 23 in which the twenty-three winding assemblages 22₁ through 22₂₃ are assembled is expanded in diameter to form a C shape that is wider than a circumferential width of the twenty-fourth winding assemblage 22₂₄ between the first winding assemblage 22₁ and the twenty-third winding assemblage 22₂₃.

Next, as shown in FIG. 18, the twenty-fourth winding assemblage 22₂₄ is mounted onto an end near the twenty-third winding assemblage 22₂₃ of the assemblage 23. In addition, as shown in FIG. 19, an opening of the C-shaped assemblage 23 is closed such that the first winding assemblage 22₁ and the twenty-fourth winding assemblage 22₂₄ are fitted together, to assemble the annular winding assembly 21 that is shown in FIG. 5.

In the winding assembly 21 that is assembled in this manner, columns in which the first rectilinear portions 221a and the second rectilinear portions 222b are arranged alternately in a radial direction and columns in which the first rectilinear portions 222a and the second rectilinear portions 221b are arranged alternately in a radial direction are arranged alternately in a circumferential direction at a uniform angular pitch.

Next, forty-eight core blocks 12 are arranged at an approximately uniform angular pitch circumferentially such that respective teeth are positioned on a radially outer side between adjacent columns of first and second rectilinear portions 221a, 222a, 221b, and 222b of the winding assembly 21, as shown in FIG. 20. Next, the core blocks 12 that are arranged circumferentially are simultaneously moved radially inward. The respective teeth 12b of the core blocks 12 are thereby inserted between the adjacent columns of first and second rectilinear portions 221a, 222a, 221b, and 222b. When the core blocks 12 are moved radially further inward, circumferential side surfaces of the adjacent core blocks 12 are butted against each other, preventing radially inward movement of the core blocks 12. The forty-eight core blocks 12 are thereby mounted into the winding assembly 21, as shown in FIG. 21.

The winding assembly 21 is thereby mounted into the stator core 11, which is constituted by the forty-eight core blocks 12. Here, in a step of inserting the teeth 12b of the core blocks 12 between the first and second rectilinear portions 221a, 222a, 221b, and 222b from an outer radial side of the winding assembly 21, because tapered teeth 12b are inserted between each of the columns of first and second rectilinear portions 221a, 222a, 221b, and 222b from radially outside and moved radially inward, the sixteen first and second rectilinear portions 221a, 222a, 221b, and 222b are arranged neatly into single columns. As shown in FIG. 21, inside each of the slots 13, eight first and second rectilinear portions 221a, 222a, 221b, and 222b are housed such that the long sides of the oblong cross sections are oriented circumferentially so as to line up neatly in a single column in a radial direction.

In the winding assemblages 22 that are mounted to the stator core 11, as shown in FIG. 22, the first coil ends 221c and 222c of the first winding bodies 221 and the second winding bodies 222 are led axially outward from the slots 13 at an angle θ relative to the end surface of the stator core 11, are turned around at the first top portions 221e and 222e, and are then returned at an angle θ relative to the end surface of the stator core 11 to be housed in the slots 13. The second coil ends 221d and 222d of the first winding bodies 221 and the second winding bodies 222 are led axially outward from the slots 13 at an angle θ relative to the end surface of the stator core 11, are turned around at the second top portions 221f and 222f, and are then returned at an angle θ relative to the end surface of the stator core 11 to be housed in the slots 13.

The first rectilinear portions 221a of the first winding bodies 221 of the winding assemblages 22 are housed in the same slots 13 as the second rectilinear portions 222b of the second winding bodies 222 of other winding assemblages 22. The second rectilinear portions 221b of the first winding bodies 221 of the winding assemblages 22 are housed in the same slots 13 as the first rectilinear portions 222a of the second winding bodies 222 of other winding assemblages 22. Thus, as shown in FIGS. 23A and 23B, columns in which the first rectilinear portions 221a and the second rectilinear portions 222b are arranged alternately in a radial direction and columns in which the first rectilinear portions 222a and the second rectilinear portions 221b are arranged alternately in a radial direction are housed alternately in slots 13 that are arranged in a circumferential direction.

Figure 24:
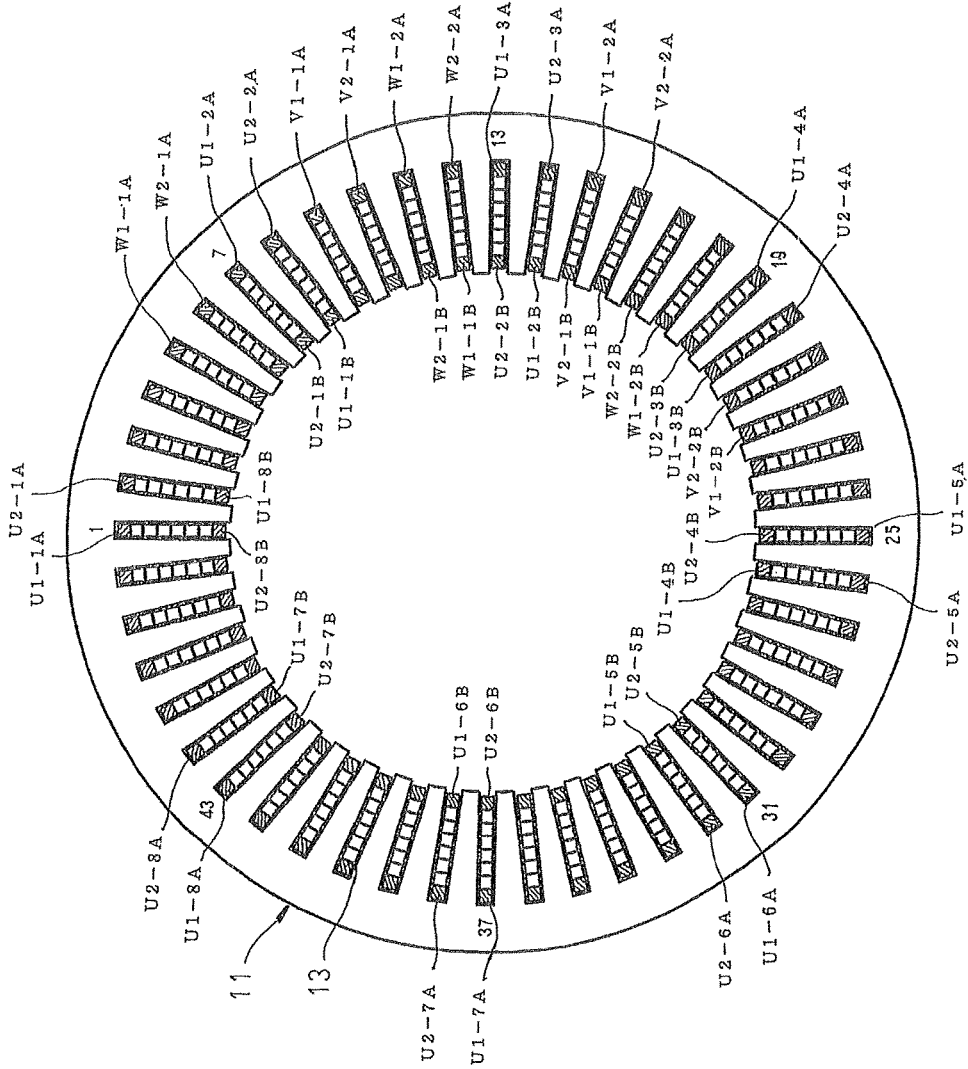
FIG. 24 is an end elevation that shows terminal positions of the stator winding in the rotary electric machine according to Embodiment 1 of the present invention.

Next, a method for connecting the winding assembly 21 will be explained with reference to FIGS. 24 and 25. FIG. 24 is an end elevation that shows terminal positions of the stator winding in the rotary electric machine according to Embodiment 1 of the present invention, and FIG. 25 is a schematic diagram that explains a method for connecting a U-phase winding of the stator winding in the rotary electric machine according to Embodiment 1 of the present invention.

Terminal positions of the first and second winding bodies 221 and 222 that are mounted into the stator core 11 are shown in FIG. 24. In FIG. 24, 1, 4, 7, etc., through 42 are slot numbers that have been allotted to the slots 13 sequentially in a circumferential direction. U1-1A, U1-2A, etc., through U1-8A and U1-1B, U1-2B, etc., through U1-8B are winding ends of first winding bodies 221 that constitute a U-phase winding in which first rectilinear portions 221a are mounted into a group of slots 13 at Slot Numbers (1+6n), where n is a natural number that includes 0, and U2-1A, U2-2A, etc., through U2-8A and U2-1B, U2-2B, etc., through U2-8B are winding ends of second winding bodies 222 that constitute a U-phase winding in which first rectilinear portions 222a are mounted into a group of slots 13 at Slot Numbers (2+6n), where n is a natural number that includes 0.

First and second winding bodies 221 and 222 in which first rectilinear portions 221a are mounted into a group of slots 13 at Slot Numbers (9+6n) and first rectilinear portions 222a are mounted into a group of slots 13 at Slot Numbers (10+6n) constitute a V-phase winding. In addition, first and second winding bodies 221 and 222 in which first rectilinear portions 221a are mounted into a group of slots 13 at Slot Numbers (5+6n) and first rectilinear portions 222a are mounted into a group of slots 13 at Slot Numbers (6+6n) constitute a W-phase winding. Here, to facilitate explanation only V1-1A, V1-2A, V1-1B, V1-2B, V2-1A, V2-2A, V2-1B, and V2-2B are shown as winding ends of the first and second winding bodies 221 and 222 that constitute the V-phase winding, and only W1-1A, W1-2A, W1-1B, W1-2B, W2-1A, W2-2A, W2-1B, and W2-2B are shown as winding ends of the first and second winding bodies 221 and 222 that constitute the W-phase winding.

Figure 25:
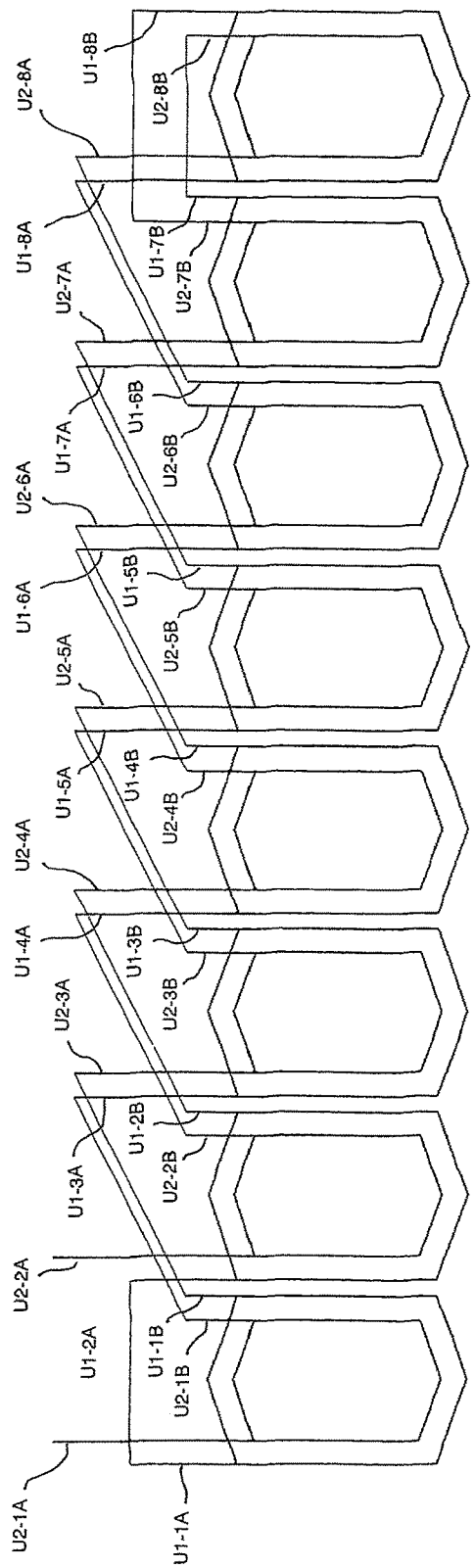
FIG. 25 is a schematic diagram that explains a method for connecting a U-phase winding of the stator winding in the rotary electric machine according to Embodiment 1 of the present invention.

To produce the U-phase winding, as shown in FIG. 25, U2-1B and U1-3B, U1-3B and U2-5A, U2-5B and U1-7A, U1-7B and U2-8B, U2-8A and U1-6B, U1-6A and U2-4B, U2-4A and U1-2B, U1-2A and U1-1A, U1-1B and U2-3A, U2-3B and U2-5A, U2-5B and U2-7A, U2-7B and U1-8B, U1-8A and U2-6B, U2-6A and U1-4B, and U1-4A and U2-8B are first connected. A U-phase winding in which sixteen first and second winding bodies 221 and 222 are connected in series is obtained thereby. U2-1A and U2-2A constitute an electric power supply end and a neutral point of the U-phase winding.

Sixteen first and second winding bodies 221 and 222 that form a V phase are similarly connected in series to obtain a V-phase winding. Sixteen first and second winding bodies 221 and 222 that form a W phase are similarly connected in series to obtain a W-phase winding. The U-phase winding, the V-phase winding, and the W-phase winding that are configured in this manner are windings in which a long-pitch winding and a short-pitch winding are combined, and have winding resistances that are equal to those of full-pitch windings.

Figure 26:
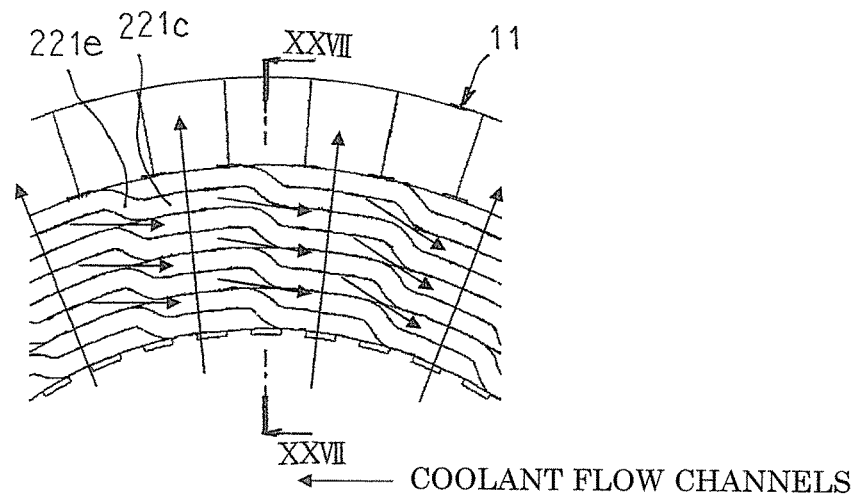
FIG. 26 is a partial end elevation that shows a first coil end group of the stator in the rotary electric machine according to Embodiment 1 of the present invention when viewed from axially outside.
Figure 27:
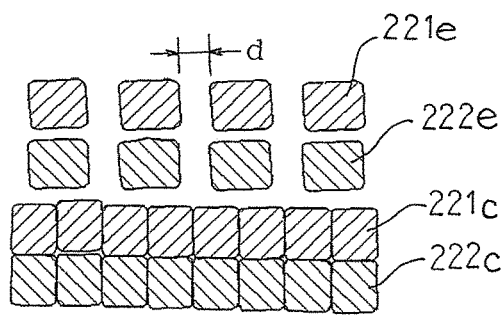
FIG. 27 is a cross section that is taken along Line XXVII-XXVII in FIG. 26 so as to be viewed in the direction of the arrows.
Figure 28:
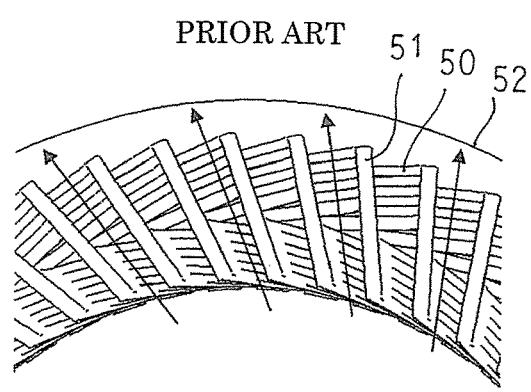
FIG. 28 is a partial end elevation that shows a first coil end group of a stator in a conventional rotary electric machine when viewed from axially outside.
Figure 29:
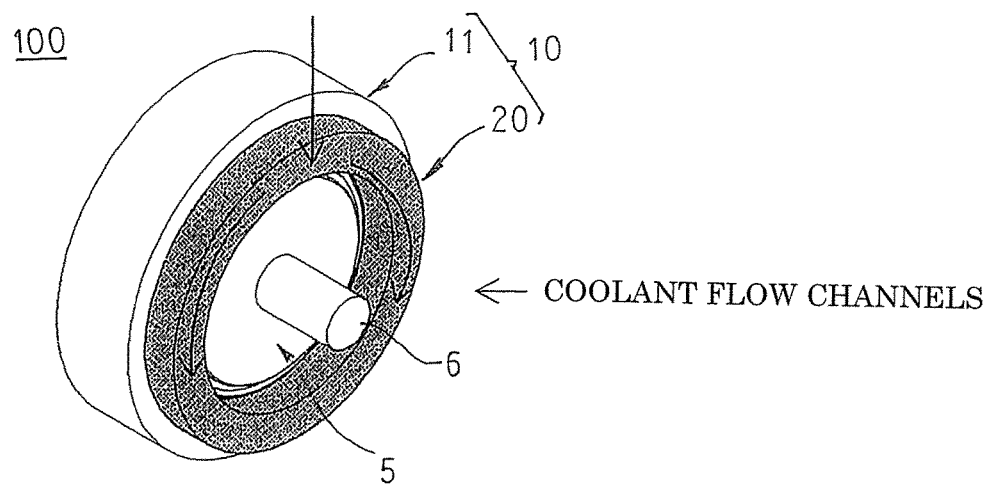
FIG. 29 is an oblique projection that shows a cooling mechanism in the rotary electric machine according to Embodiment 1 of the present invention.

Next, effects due to Embodiment 1 will be explained using FIGS. 26 through 29. FIG. 26 is a partial end elevation that shows a first coil end group of the stator in the rotary electric machine according to Embodiment 1 of the present invention when viewed from axially outside, FIG. 27 is a cross section that is taken along Line XXVII-XXVII in FIG. 26 so as to be viewed in the direction of the arrows, FIG. 28 is a partial end elevation that shows a first coil end group of a stator in a conventional rotary electric machine when viewed from axially outside, and FIG. 29 is an oblique projection that shows a cooling mechanism in the rotary electric machine according to Embodiment 1 of the present invention. Moreover, for simplicity, only cross sections of the coil ends are shown in FIG. 27.

First, in the conventional rotary electric machine that is described in Patent Literature 1, because the bundles of coil ends 50 of the hexagonal coils are shaped by bending at the vertex portions 51 into crank shapes on end surfaces of the stator core 52, as shown in FIG. 28, the vertex portions 51 of the coil ends 50 that are adjacent to each other in a radial direction of the respective hexagonal coils contact each other or are extremely close to each other. Thus, as indicated by arrows in FIG. 28, columns of vertex portions 51 of coil ends 50 that are lined up without gaps in a radial direction are arranged circumferentially at a pitch of approximately one slot, and coolant flow channels that have the flow channel directions in a radial direction are formed between the columns of vertex portions 51. Moreover, because the respective vertex portions 51 of the coil ends 50 that are adjacent to each other in the radial direction of the hexagonal coils contact each other or are extremely close to each other, coolant flow channels that have flow channel directions in a circumferential direction are not formed between the radially adjacent vertex portions 51.

In Embodiment 1, the first winding bodies 221 are configured so as to have a helical shape by winding a conductor wire for four turns such that the first rectilinear portions 221a and the second rectilinear portions 221b are separated by an angular spacing of seven slots, and the second winding bodies 222 are configured so as to have a helical shape by winding a conductor wire for four turns such that the first rectilinear portions 222a and the second rectilinear portions 222b are separated by an angular spacing of five slots. The first winding bodies 221 and the second winding bodies 222 are disposed concentrically, and the respective orbiting portions of the second winding bodies 222 are disposed on inner circumferential sides of the corresponding orbiting portions of the first winding bodies 221. Thus, an external surface of a first coil end group of the stator winding 20 is constituted by the first coil ends 221c of the first winding bodies 221, and an external surface of a second coil end group is constituted by the second coil ends 221d of the first winding bodies 221.

In the first coil end group of the stator winding 20, as shown in FIG. 26, columns of four first top portions 221e which are lined up in single columns in a radial direction of the first winding bodies 22 are arranged at a pitch of approximately two slots in a circumferential direction. Thus, as indicated by arrows in FIG. 26, coolant flow channels that have flow channel directions in a radial direction are formed on the external surface of the first coil end group of the stator winding 20 between the columns of the first top portions 221e that are lined up in single columns radially.

As shown in FIG. 27, gaps d are formed between radially adjacent first coil ends 221c. Thus, as indicated by arrows in FIG. 26, coolant flow channels that have flow channel directions in a circumferential direction are formed on the external surface of the first coil end group of the stator winding 20 between the radially adjacent first coil ends 221c.

Moreover, coolant flow channels that have flow channel directions in a radial direction and coolant flow channels that have flow channel directions in a circumferential direction are also similarly formed on the second coil end group.

According to Embodiment 1, because coolant flow channels that have flow channel directions in a radial direction are formed between columns of first top portions 221e that are arranged at a pitch of approximately two slots in a circumferential direction, flow channel width is wider than in coolant flow channels in conventional examples that are formed between columns of vertex portions 51 that are arranged at a pitch of approximately one slot in a circumferential direction, enabling increases in heat radiating area of the coil end groups to be achieved. According to Embodiment 1, because coolant flow channels that have flow channel directions in a circumferential direction are formed on the coil end groups of the stator winding 20, increases in heat radiating area of the coil end groups can be achieved. Thus, according to Embodiment 1, the heat radiating area of the coil end groups is increased, enabling heat that is generated in the stator winding 20 to be radiated to the coolant efficiently.

Now, if the rotary electric machine 100 that is configured in this manner is installed such that the rotating shaft 6 is horizontal, and a cooling mechanism is adopted such that a coolant is dripped thereon from a radial direction, as shown in FIG. 29, high cooling performance can be achieved.

Next, in conventional rotary electric machines such as that described in Patent Literature 1, as shown in FIG. 28, bundles of coil ends 50 of the hexagonal coils are bent at the vertex portions 51 and formed into crank shapes to make the hexagonal coils mountable to the stator core 52. Thus, if the hexagonal coils are configured by winding conductor wire that has a width d for four turns, for example, then bundles of four coil ends 50 must be bent at the vertex portions 51 so as to be offset by 4d in a radial direction. Consequently, in conventional examples, bundles of conductor wire that have significant rigidity must be bent by a significant amount of displacement, increasing the radial dimensions and axial dimensions of the bundle of coil ends, i.e., the coil end groups, making reductions in size difficult.

In Embodiment 1, on the other hand, first and second coil ends 221c, 221d, 222c, and 222d are bent at first and second top portions 221e, 221f, 222e, and 222f, and first winding bodies 221 and second winding bodies 222 in which first rectilinear portions 221a and 222a and second rectilinear portions 221b and 222b are shifted by d in a radial direction are assembled concentrically to produce winding assemblages 22. According to Embodiment 1, because individual coil ends are bent at top portions so as to be displaced by d in a radial direction, bending at the top portions is facilitated, enabling the radial dimensions and axial dimensions of the bundle of coil ends, i.e., the coil end groups, to be reduced. Thus, the rotary electric machine can be reduced in size, and circumferences of the coil ends are also made shorter, reducing winding resistance, and enabling increased efficiency to be achieved in the rotary electric machine.

Thus, in Embodiment 1, because the amount of radial displacement at the first and second top portions 221e, 221f, 222e, and 222f is d, which is less than the overall width (4d) of the first and second rectilinear portions 221a, 221b, 222a, and 222b in the direction of arrangement, the radial dimensions and axial dimensions of the coil end groups can be reduced compared to conventional examples.

Embodiment 2

In Embodiment 1 above, a rotary electric machine has been explained in which slots are formed in a stator core at a ratio of two slots per phase per pole, and the stator winding is a three-phase alternating-current winding, but in Embodiment 2, a rotary electric machine will be explained in which slots are formed in a stator core at a ratio of three slots per phase per pole, and the stator winding is a three-phase alternating-current winding.

Figure 30:
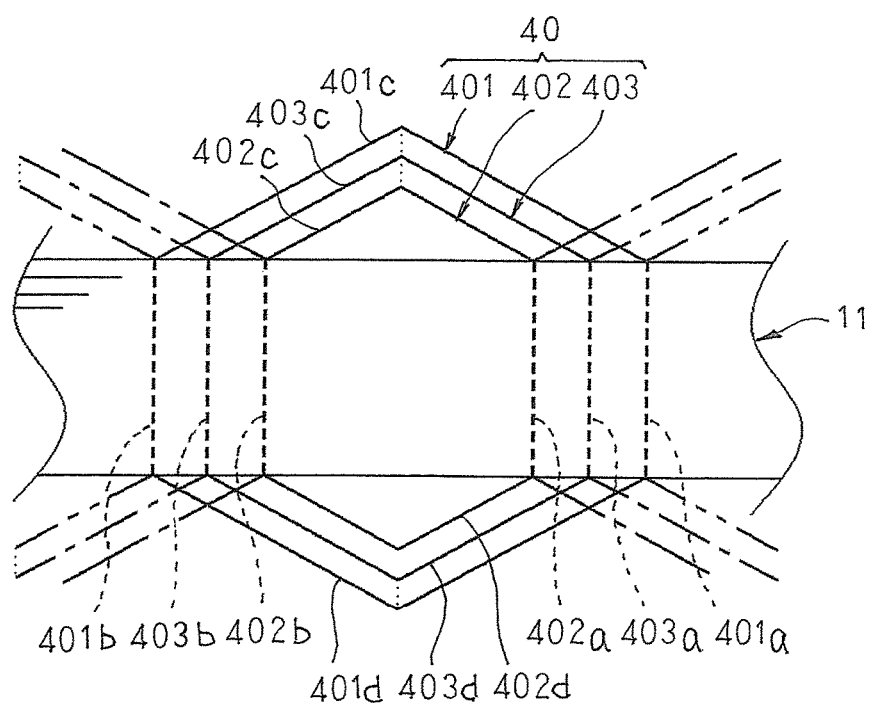
FIG. 30 is a developed projection in which a state in which a winding assemblage in a rotary electric machine according to Embodiment 2 of the present invention is mounted into a stator core is viewed from radially outside.

FIG. 30 is a developed projection in which a state in which winding assemblages in a rotary electric machine according to Embodiment 2 of the present invention is mounted into a stator core is viewed from radially outside.

In FIG. 30, a winding assemblage 40 includes a first winding body 401, a second winding body 402, and a third winding body 403 that are configured by winding a conductor wire that has an oblong cross section for four turns helically in an approximate hexagon shape so as to leave a constant spacing between each turn.

The first winding body 401 includes: first and second rectilinear portions 401a and 401b that form two columns that are separated by an angular pitch of eleven slots in which four of each are arranged in a direction of short sides of the oblong cross sections so as to leave gaps d in each of the columns; and first and second coil ends 401c and 401d that alternately link first longitudinal ends to each other and second longitudinal ends to each other between the columns of first and second rectilinear portions 401a and 401b. This first winding body 401 is configured at a winding pitch of a long-pitch winding.

The second winding body 402 includes: first and second rectilinear portions 402a and 402b that form two columns that are separated by an angular pitch of seven slots in which four of each are arranged in a direction of short sides of the oblong cross sections so as to leave gaps d in each of the columns; and first and second coil ends 402c and 402d that alternately link first longitudinal ends to each other and second longitudinal ends to each other between the columns of first and second rectilinear portions 402a and 402b. This second winding body 402 is configured at a winding pitch of a short-pitch winding.

The third winding body 403 includes: first and second rectilinear portions 403a and 403b that form two columns that are separated by an angular pitch of nine slots in which four of each are arranged in a direction of short sides of the oblong cross sections so as to leave gaps d in each of the columns; and first and second coil ends 403c and 403d that alternately link first longitudinal ends to each other and second longitudinal ends to each other between the columns of first and second rectilinear portions 403a and 403b. This third winding body 403 is configured at a winding pitch of a full-pitch winding.

The first winding body 401, the second winding body 402, and the third winding body 403 are assembled such that helical winding portions thereof are disposed concentrically, to constitute the winding assemblage 40. Winding assemblages 40 that are configured in this manner are housed at a pitch of three slots in slots of a stator core that are formed at a ratio of three slots per phase per pole, to configure constitute a stator winding.

In Embodiment 2, because the first winding body 401, the second winding body 402, and the third winding body, which have different distances between columns of first and second rectilinear portions 401a, 401b, 402a, 402b, 403a, and 403b, are disposed concentrically, similar or identical effects to those in Embodiment 1 above are also exhibited.

Embodiment 3

Figure 31A:
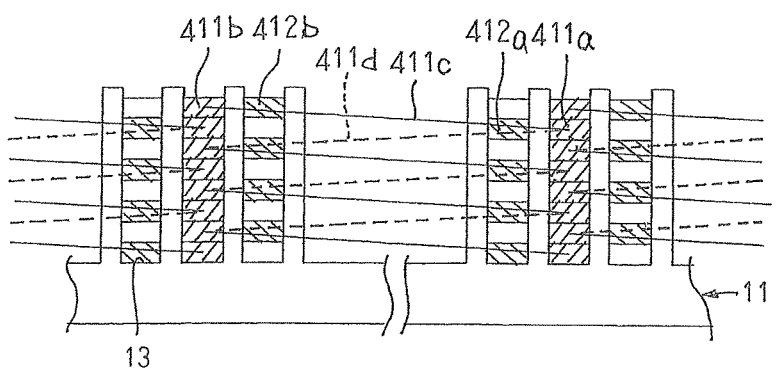
FIGS. 31A and 31B show developed projections in which a state in which winding assemblages in a rotary electric machine according to Embodiment 3 of the present invention are mounted into a stator core is viewed from a first axial end.
Figure 31B:
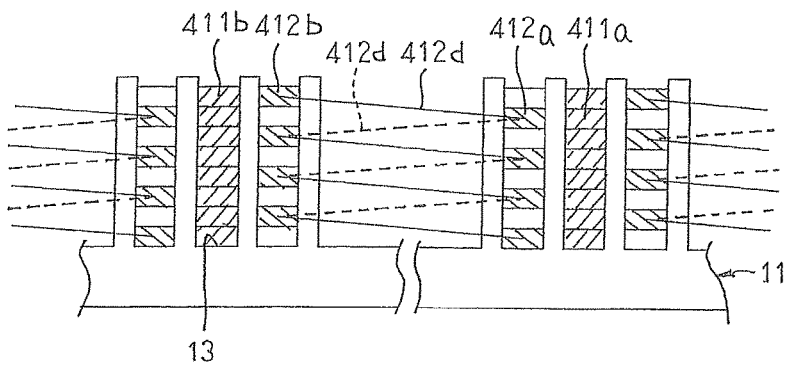

FIGS. 31A and 31B show a developed projection in which the state in which a winding assemblage in a rotary electric machine according to Embodiment 3 of the present invention is mounted into a stator core is viewed from a first axial end, FIG. 31A showing arrangement of the first winding bodies, and FIG. 31B showing arrangement of the second winding bodies. FIG. 32 is a schematic diagram that explains a method for connecting a U-phase winding of a stator winding in the rotary electric machine according to Embodiment 3 of the present invention.

As shown in FIG. 31A, a first winding body 411 includes: first and second rectilinear portions 411a and 411b that form two columns that are separated by an angular spacing of six slots in which four of each are arranged in a direction of short sides of the oblong cross sections so as to leave gaps d in each of the columns; and first and second coil ends 411c and 411d that alternately link first longitudinal ends to each other and second longitudinal ends to each other between the columns of first and second rectilinear portions 411a and 411b. This first winding body 411 is configured at a winding pitch of a full-pitch winding.

As shown in FIG. 31B, a second winding body 412 includes: first and second rectilinear portions 412a and 412b that form two columns that are separated by an angular spacing of six slots in which four of each are arranged in a direction of short sides of the oblong cross sections so as to leave gaps d in each of the columns; and first and second coil ends 412c and 412d that alternately link first longitudinal ends to each other and second longitudinal ends to each other between the columns of first and second rectilinear portions 412a and 412b. This second winding body 412 is configured at a winding pitch of a short-pitch winding.

Although not shown, the first winding body 411 and the second winding body 412 are assembled such that helical winding portions thereof are disposed concentrically, to constitute a winding assemblage. Winding assemblages that are configured in this manner are housed at a pitch of two slots in slots of a stator core that are formed at a ratio of two slots per phase per pole, to configure constitute a stator winding.

Moreover, Embodiment 3 is configured in a similar or identical manner to that of Embodiment 1 above except that the first and second winding bodies 411 and 412 are used instead of the first and second winding bodies 221 and 222.

In Embodiment 3, because the first winding body 411 and the second winding body 412, which have different distances between columns of first and second rectilinear portions 411a, 411b, 412a, and 412b, are disposed concentrically, similar or identical effects to those in Embodiment 1 above are also exhibited.

In Embodiment 3, the first rectilinear portions 411a of the first winding bodies 411, which are full-pitch windings, are housed inside identical slots 13 to the second rectilinear portions 411b of other same-phase first winding bodies 411 (other first winding bodies 411 that are phase-shifted by 180 electrical degrees). The first rectilinear portions 412a of the second winding bodies 412, which are short-pitch windings, are housed inside identical slots 13 to the second rectilinear portions 412b of the second winding bodies 412 of other phases. A rotary electric machine that has short-pitch windings electromagnetically is configured thereby, enabling higher harmonic components to be suppressed.

Next, a method for connecting a U-phase winding of the stator winding will be explained with reference to FIG. 32. In FIG. 32, U1-1A, U1-2A, etc., through U1-8A and U1-1B, U1-2B, etc., through U1-8B are winding ends of first winding bodies 411 that constitute a U-phase winding in which first rectilinear portions 411a of the first winding bodies 411 are mounted into a group of slots 13 at Slot Numbers (1+6n), where n is a natural number that includes 0, and U2-1A, U2-2A, etc., through U2-8A and U2-1B, U2-2B, etc., through U2-8B are winding ends of second winding bodies 412 that constitute a U-phase winding in which first rectilinear portions 412a are mounted into a group of slots 13 at Slot Numbers (2+6n), where n is a natural number that includes 0.

To produce the U-phase winding, as shown in FIG. 32, U1-1B and U1-2A, U1-2B and U1-3A, U1-3B and U1-4A, U1-4B and U1-5A, U1-5B and U1-6A, U1-6B and U1-7A, and U1-7B and U1-8B are first connected. A U1-phase winding in which eight first winding bodies 411 are connected in series is obtained thereby. U1-1A and U1-8B constitute an electric power supply end (411in) and a neutral point (411n) of the U1-phase winding.

Next, as shown in FIG. 32, U2-1B and U2-2A, U2-2B and U2-3A, U2-3B and U2-4A, U2-4B and U2-5A, U2-5B and U2-6A, U2-6B and U2-7A, and U2-7B and U2-8B are connected. A U2-phase winding in which eight second winding bodies 412 are connected in series is obtained thereby. U2-1A and U2-8B constitute an electric power supply end (412in) and a neutral point (412n) of the U2-phase winding.

A V1-phase winding in which eight first winding bodies 411 that constitute a V-phase winding are connected in series is similarly obtained, and a V2-phase winding in which eight second winding bodies 412 are connected in series is obtained. A W1-phase winding in which eight first winding bodies 411 that constitute a W-phase winding are connected in series is similarly obtained, and a W2-phase winding in which eight second winding bodies 412 are connected in series is obtained.

In Embodiment 3, a first three-phase alternating-current winding is constituted by the U1-phase winding, the V1-phase winding, and the W1-phase winding, and second three-phase alternating-current winding is constituted by the U2-phase winding, the V2-phase winding, and the W2-phase winding. Dedicated inverters are connected to each of the first and second three-phase alternating-current windings to operate the rotary electric machine. Consequently, the rotary electric machine can be operated even if a wire breakage occurs in one of the three-phase alternating-current windings.

Furthermore, each of the phase windings of the first three-phase alternating-current winding is configured by connecting the full-pitch first winding bodies 411 in series, and each of the phase windings of the second three-phase alternating-current winding is configured by connecting the short-pitch second winding bodies 412 in series. Thus, because electric currents of different magnitude can be passed to the first three-phase alternating-current winding and the second three-phase alternating-current winding, harmonics of the magnetomotive forces from the stator can be reduced, and core loss and pulsation of torque due to harmonics can also be reduced.

Embodiment 4

Figure 33A:
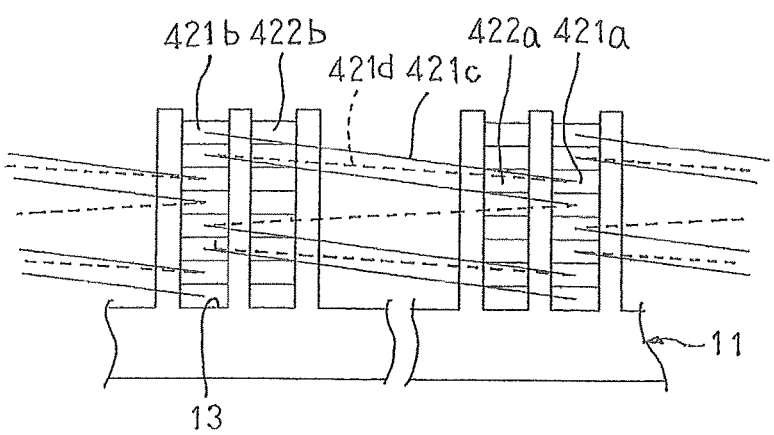
FIGS. 33A and 33B show developed projections in which the state in which winding assemblages in a rotary electric machine according to Embodiment 4 of the present invention are mounted into a stator core is viewed from a first axial end.
Figure 33B:
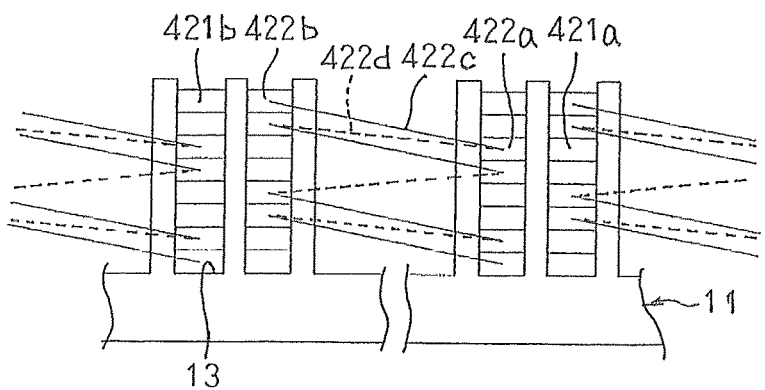

FIGS. 33A and 33B show developed projections in which the state in which winding assemblages in a rotary electric machine according to Embodiment 4 of the present invention are mounted into a stator core is viewed from a first axial end, FIG. 33A showing arrangement of the first winding bodies, and FIG. 33B showing arrangement of the second winding bodies. Moreover, in FIGS. 33A and 33B, first coil ends are represented by solid lines, and second coil ends are represented by broken lines. Furthermore, for simplicity, first and second coil ends are represented using straight lines in FIG. 33.

As shown in FIG. 33A, a first winding body 421 includes: first and second rectilinear portions 421a and 421b that form two columns that are separated by an angular spacing of seven slots in which four of each are arranged in a direction of short sides of the oblong cross sections so as to leave gaps d in each of the columns; and first and second coil ends 421c and 421d that alternately link first longitudinal ends to each other and second longitudinal ends to each other between the columns of first and second rectilinear portions 421a and 421b. Here, the amount of radial displacement of the first coil ends 421c at the first top portions is 2d, and the amount of radial displacement of the second coil ends 421d at the second top portions is d. This first winding body 421 is configured at a winding pitch of a long-pitch winding.

As shown in FIG. 33B, a second winding body 422 includes: first and second rectilinear portions 422a and 422b that form two columns that are separated by an angular spacing of four slots in which four of each are arranged in a direction of short sides of the oblong cross sections so as to leave gaps d in each of the columns; and first and second coil ends 422c and 422d that alternately link first longitudinal ends to each other and second longitudinal ends to each other between the columns of first and second rectilinear portions 422a and 422b. Here, the amount of radial displacement of the first coil ends 422c at the first top portions is 2d, and the amount of radial displacement of the second coil ends 422d at the second top portions is d. This second winding body 422 is configured at a winding pitch of a short-pitch winding.

The first winding body 421 and the second winding body 422 are assembled such that helical winding portions thereof are disposed concentrically, to constitute a winding assemblage. Winding assemblages that are configured in this manner are housed at a pitch of two slots in slots of a stator core that are formed at a ratio of two slots per phase per pole, to configure constitute a stator winding.

Moreover, Embodiment 4 is configured in a similar or identical manner to that of Embodiment 1 above except that the first and second winding bodies 421 and 422 are used instead of the first and second winding bodies 221 and 222.

In Embodiment 4, because the first winding body 421 and the second winding body 422, which have different distances between columns of first and second rectilinear portions 421a, 421b, 422a, and 422b, are disposed concentrically, similar or identical effects to those in Embodiment 1 above are also exhibited.

In Embodiment 4, because the amount of radial displacement at the first and second top portions is less than the overall width (4d) of the first and second rectilinear portions 421a, 421b, 422a, and 422b in the direction of arrangement, the radial dimensions and axial dimensions of the coil end groups can also be reduced compared to conventional examples.

Embodiment 5

Figure 34A:
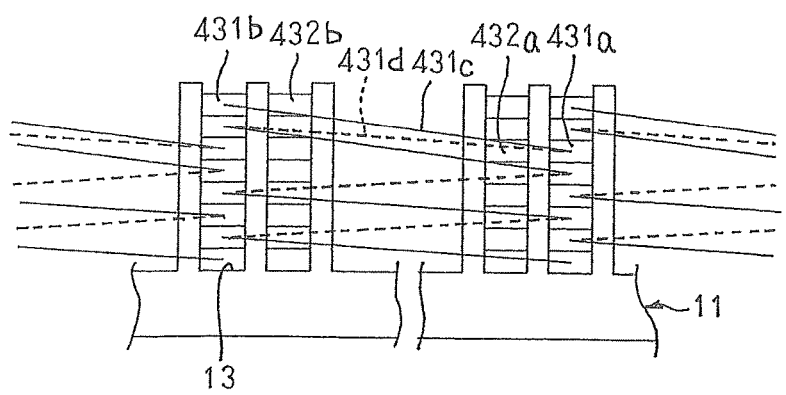
FIGS. 34A and 34B show developed projections in which the state in which winding assemblages in a rotary electric machine according to Embodiment 5 of the present invention are mounted into a stator core is viewed from a first axial end.
Figure 34B:
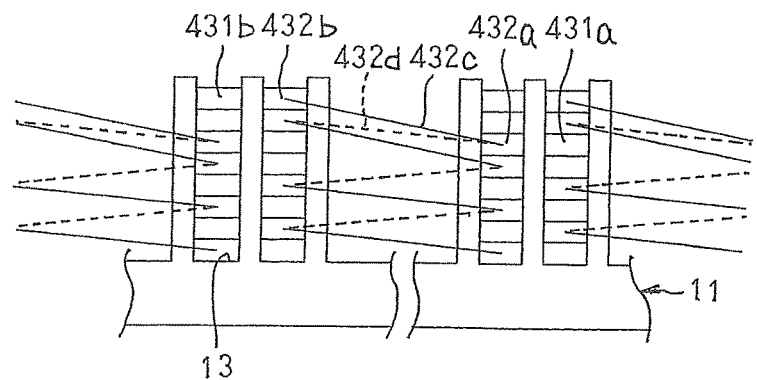

FIGS. 34A and 34B show developed projections in which the state in which winding assemblages in a rotary electric machine according to Embodiment 5 of the present invention are mounted into a stator core is viewed from a first axial end, FIG. 34A showing arrangement of the first winding bodies, and FIG. 34B showing arrangement of the second winding bodies. Moreover, in FIGS. 34A and 34B, first coil ends are represented by solid lines, and second coil ends are represented by broken lines. Furthermore, for simplicity, first and second coil ends are represented using straight lines in FIGS. 34A and 34B.

As shown in FIG. 34A, a first winding body 431 includes: first and second rectilinear portions 431a and 431b that form two columns that are separated by an angular spacing of seven slots in which four of each are arranged in a direction of short sides of the oblong cross sections so as to leave gaps d in each of the columns; and first and second coil ends 431c and 431d that alternately link first longitudinal ends to each other and second longitudinal ends to each other between the columns of first and second rectilinear portions 431a and 431b. Here, the amount of radial displacement of the first coil ends 431c at the first top portions is d or 2d, and the amount of radial displacement of the second coil ends 431d at the second top portions is d. This first winding body 431 is configured at a winding pitch of a long-pitch winding.

As shown in FIG. 34B, a second winding body 432 includes: first and second rectilinear portions 432a and 432b that form two columns that are separated by an angular spacing of four slots in which four of each are arranged in a direction of short sides of the oblong cross sections so as to leave gaps d in each of the columns; and first and second coil ends 432c and 432d that alternately link first longitudinal ends to each other and second longitudinal ends to each other between the columns of first and second rectilinear portions 432a and 432b. Here, the amount of radial displacement of the first coil ends 432c at the first top portions is d or 2d, and the amount of radial displacement of the second coil ends 432d at the second top portions is d. This second winding body 432 is configured at a winding pitch of a short-pitch winding.

The first winding body 431 and the second winding body 432 are assembled such that helical winding portions thereof are disposed concentrically, to constitute a winding assemblage. Winding assemblages that are configured in this manner are housed at a pitch of two slots in slots of a stator core that are formed at a ratio of two slots per phase per pole, to configure constitute a stator winding.

Moreover, Embodiment 5 is configured in a similar or identical manner to that of Embodiment 1 above except that the first and second winding bodies 431 and 432 are used instead of the first and second winding bodies 221 and 222.

In Embodiment 5, because the first winding body 431 and the second winding body 432, which have different distances between columns of first and second rectilinear portions 431a, 431b, 432a, and 432b, are disposed concentrically, similar or identical effects to those in Embodiment 1 above are also exhibited.

In Embodiment 5, because the amount of radial displacement at the first and second top portions is less than the overall width (4d) of the first and second rectilinear portions 431a, 431b, 432a, and 432b in the direction of arrangement, the radial dimensions and axial dimensions of the coil end groups can also be reduced compared to conventional examples.

Moreover, each of the above embodiments has been explained using a stator, but the armature is not limited to a stator, and similar or identical effects are also obtained if the present application is applied to a rotor where the rotor is a wound rotor.

In each of the above embodiments, an eight-pole forty-eight-slot rotary electric machine has been explained, but it goes without saying that the number of poles and the number of slots are not limited to eight poles and forty-eight slots. Furthermore, the slots are formed at a ratio of two, or three, slots per phase per pole, but the number of slots per phase per pole need only be two or greater.

In each of the above embodiments, the stator winding is configured into a three-phase alternating-current winding, but the stator winding is not limited to a three-phase alternating-current winding, and may be a five-phase alternating-current winding, for example.

In each of the above embodiments, winding bodies are produced using a conductor wire that has an oblong cross section, but winding bodies may be produced using conductor wire that has a circular cross section. In that case, bending of the conductor wire is facilitated.

The invention claimed is:

1. A rotary electric machine comprising an armature that includes:
   an annular armature core in which slots are formed at a ratio of n per phase per pole, where n is a natural number that is greater than or equal to two; and
   an armature winding that is mounted to said armature core,
   wherein:
   said armature winding is configured by mounting into respective corresponding slot pairs n types of winding bodies that are each configured by winding a jointless, continuous conductor wire that is coated with insulation for m turns into a helical shape in which end portions of rectilinear portions are linked together by coil ends, where m is a natural number that is greater than or equal to two, said n types of winding bodies having different spacings between said rectilinear portions that are linked by said coil ends;
   said n types of winding bodies are housed in n adjacent pairs of slot pairs and are configured so as to be concentric;
   said coil ends include a top portion that is a central portion between rectilinear portions in the same turn and that displaces by a predetermined amount in a radial direction at an approximately central portion between said linked rectilinear portions; and
   said radial displacement at said top portion is approximately a×d, where a is a natural number that is greater than or equal to 1 and less than or equal to (m−1), and d is a radial thickness of said rectilinear portions that are housed inside said slots, 2×m of said rectilinear portions of two different types of said winding bodies being housed inside said slots so as to line up in single columns in a radial direction for improving cooling performance of the armature winding.

2. The rotary electric machine according to claim 1, wherein points of intersection of diagonals of oblongs that have said rectilinear portions that are linked by said coil ends of said respective winding bodies as two facing parallel sides are aligned when viewed from radially inside said n types of winding bodies that are configured so as to be concentric.

3. The rotary electric machine according to claim 1, wherein respective phase windings of said armature winding are constituted by a single winding that is formed by connecting said n types of winding bodies in series.

4. The rotary electric machine according to claim 3, wherein points of intersection of diagonals of oblongs that have said rectilinear portions that are linked by said coil ends of said respective winding bodies as two facing parallel sides are aligned when viewed from radially inside said n types of winding bodies that are configured so as to be concentric.

5. The rotary electric machine according to claim 1, wherein respective phase windings of said armature winding are constituted by n windings that are each formed by connecting in series identical types of winding bodies among said n types of winding bodies.

6. The rotary electric machine according to claim 5, wherein points of intersection of diagonals of oblongs that have said rectilinear portions that are linked by said coil ends of said respective winding bodies as two facing parallel sides are aligned when viewed from radially inside said n types of winding bodies that are configured so as to be concentric.

* * * * *